(12) United States Patent
Nitta et al.

(10) Patent No.: US 11,852,788 B2
(45) Date of Patent: Dec. 26, 2023

(54) IMAGING LENS

(71) Applicant: TOKYO VISIONARY OPTICS CO., LTD., Tokyo (JP)

(72) Inventors: Koji Nitta, Tokyo (JP); Masaya Hashimoto, Fukushima (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 126 days.

(21) Appl. No.: 16/895,623

(22) Filed: Jun. 8, 2020

(65) Prior Publication Data

US 2021/0191086 A1 Jun. 24, 2021

(30) Foreign Application Priority Data

Jun. 10, 2019 (JP) .................. 2019-108019

(51) Int. Cl.
| | | |
|---|---|---|
| *G02B 13/00* | (2006.01) | |
| *G02B 9/62* | (2006.01) | |
| *G02B 13/18* | (2006.01) | |
| *G02B 9/60* | (2006.01) | |

(52) U.S. Cl.
CPC .......... *G02B 13/0045* (2013.01); *G02B 9/62* (2013.01); *G02B 9/60* (2013.01); *G02B 13/18* (2013.01)

(58) Field of Classification Search
CPC ...... G02B 13/0045; G02B 9/62; G02B 13/18; G02B 13/0055; G02B 9/60
USPC ................................... 359/713, 714
See application file for complete search history.

(56) References Cited

U.S. PATENT DOCUMENTS

| | | | | |
|---|---|---|---|---|
| 2015/0098137 | A1* | 4/2015 | Chung ..................... | G02B 9/60 359/714 |
| 2015/0241662 | A1* | 8/2015 | Hashimoto ........ | G02B 13/0045 359/713 |
| 2016/0139369 | A1* | 5/2016 | Jung .................. | G02B 13/0045 359/714 |
| 2018/0299648 | A1* | 10/2018 | Hsueh ...................... | G02B 9/60 |
| 2019/0129137 | A1 | 5/2019 | Nitta et al. | |

FOREIGN PATENT DOCUMENTS

| | | |
|---|---|---|
| CN | 106526803 | 3/2017 |
| CN | 106597637 A | 4/2017 |
| CN | 108931844 A | 12/2018 |

* cited by examiner

*Primary Examiner* — George G. King
(74) *Attorney, Agent, or Firm* — Hamre, Schumann, Mueller & Larson, P.C.

(57) ABSTRACT

There is provided an imaging lens with excellent optical characteristics which satisfies demand of a low profile and a low F-number. An imaging lens comprises in order from an object side to an image side, a first lens with negative refractive power having an object-side surface being convex in a paraxial region, a second lens with positive refractive power in a paraxial region, a third lens with the negative refractive power in a paraxial region, a fourth lens with the positive refractive power in a paraxial region, a fifth lens having a flat object-side surface and a flat image-side surface that are aspheric, and a sixth lens with the negative refractive power having an image-side surface being concave in a paraxial region.

5 Claims, 11 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN106526803A) discloses an imaging lens comprising, in order from an object side, a first lens with positive refractive power having a concave image-side surface, a second lens with negative refractive power having a concave image-side surface, a third lens with positive refractive power having a convex image-side surface, a fourth lens with negative refractive power having concave surfaces on both sides, a fifth lens with positive refractive power having a concave object-side surface and a convex image-side surface, and a sixth lens with negative refractive power having a concave image-side surface.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with negative refractive power having an object-side surface being convex in a paraxial region, a second lens with positive refractive power in a paraxial region, a third lens with the negative refractive power in a paraxial region, a fourth lens with the positive refractive power in a paraxial region, a fifth lens having a flat object-side surface and a flat image-side surface that are aspheric, and a sixth lens with the negative refractive power having an image-side surface being concave in a paraxial region.

According to the imaging lens having an above-described configuration, the first lens achieves a wide field of view by strengthening the refractive power, and coma aberration, astigmatism and distortion are properly corrected. Furthermore, when the first lens has the object-side surface being convex in the paraxial region, spherical aberration and the distortion are properly corrected.

The second lens achieves reduction in a profile, and properly corrects the astigmatism and the distortion.

The third lens properly corrects chromatic aberration, the spherical aberration, the astigmatism and the distortion.

The fourth lens achieves reduction in the profile, and properly corrects the astigmatism and the distortion.

When the fifth lens has the flat object-side surface and the flat image-side surface in the paraxial region, the astigmatism, field curvature and the distortion are properly corrected by aspheric surfaces formed on both sides without affecting a focal length of the overall optical system of the imaging lens.

The sixth lens properly corrects the chromatic aberration, the astigmatism, the distortion and the field curvature. Furthermore, when the sixth lens has the image-side surface being concave in the paraxial region, a back focus can be secured while maintaining the low profile.

According to the imaging lens having the above-described configuration, it is preferable that the first lens has an image-side surface being concave in the paraxial region.

When the first lens has the image-side surface being concave in the paraxial region, the coma aberration, the astigmatism and the distortion can be properly corrected.

According to the imaging lens having the above-described configuration, it is preferable that the second lens has an image-side surface being convex in the paraxial region.

When the second lens has the image-side surface being convex in the paraxial region, a light ray incident angle to the image-side surface of the second lens can be appropriately controlled, and the astigmatism can be properly corrected.

According to the imaging lens having the above-described configuration, it is preferable that the third lens has an image-side surface being concave in the paraxial region.

When the third lens has the image-side surface being concave in the paraxial region, the astigmatism and the distortion can be properly corrected.

According to the imaging lens having the above-described configuration, it is preferable that the fourth lens has an image-side surface being convex in the paraxial region.

When the fourth lens has the image-side surface being convex in the paraxial region, a light ray incident angle to the image-side surface of the fourth lens can be appropriately controlled, and the astigmatism and the distortion can be properly corrected.

According to the imaging lens having the above-described configuration, it is preferable that the sixth lens has the image-side surface formed as an aspheric surface having at least one pole point in a position off the optical axis.

When the sixth lens has the image-side surface formed as the aspheric surface having at least one pole point in a position off the optical axis, the field curvature and the distortion are properly corrected, and a light ray incident angle to an image sensor is appropriately controlled.

According to the imaging lens having the above-described configuration, it is preferable that the following conditional expression (1) is satisfied:

$$-9.55<(T1/f1)\times100<-1.00 \quad (1)$$

where

T1: a distance along the optical axis from an image-side surface of the first lens to an object-side surface of the second lens, and f1: a focal length of the first lens.

The conditional expression (1) defines an appropriate range of a relationship between the distance along the optical axis from the image-side surface of the first lens to the object-side surface of the second lens, and the focal length of the first lens. When a value is below the upper limit of the conditional expression (1), the distance along the optical axis from the image-side surface of the first lens to the object-side surface of the second lens is prevented from being too small, and a light ray incident angle to the object-side surface of the second lens is appropriately controlled. Furthermore, the refractive power of the first lens is prevented from being too small, and the chromatic aberration can be properly corrected. On the other hand, when the value is above the lower limit of the conditional expression (1), the distance along the optical axis from the image-side surface of the first lens to the object-side surface of the second lens is prevented from being too large, and the refractive power of the first lens is prevented from being too large, and reduction in the profile is achieved.

According to the imaging lens having the above-described configuration, it is preferable that the following conditional expression (2) is satisfied:

$$0.02<T2/T3<0.60 \quad (2)$$

where

T2: a distance along the optical axis from an image-side surface of the second lens to an object-side surface of the third lens, and T3: a distance along the optical axis from an image-side surface of the third lens to an object-side surface of the fourth lens.

The conditional expression (2) defines an appropriate range of a relationship between the distance along the optical axis from the image-side surface of the second lens to the object-side surface of the third lens, and the distance along the optical axis from the image-side surface of the third lens to the object-side surface of the fourth lens. By satisfying the conditional expression (2), the third lens is arranged at an optimum position, and aberration correction function of the lens becomes more effective. As a result, reduction in the profile can be achieved, and the astigmatism and the distortion can be properly corrected.

According to the imaging lens having the above-described configuration, it is preferable that the following conditional expression (3) is satisfied:

$$-15.50<f6/D6<-1.50 \quad (3)$$

where f6: a focal length of the sixth lens, and

D6: a thickness along the optical axis of the sixth lens.

The conditional expression (3) defines an appropriate range of a relationship between the focal length of the sixth lens, and the thickness along the optical axis of the sixth lens. When a value is below the upper limit of the conditional expression (3), refractive power of the sixth lens is prevented from being too large, and the astigmatism, the field curvature and the distortion can be properly corrected. Furthermore, the thickness along the optical axis of the sixth lens is prevented from being too large, and reduction in the profile can be achieved. On the other hand, when the value is above the lower limit of the conditional expression (3), the refractive power of the sixth lens is prevented from being too small, and the chromatic aberration can be properly corrected. Furthermore, the thickness along the optical axis of the sixth lens is prevented from being too small, and the formability of the lens is improved.

According to the imaging lens having the above-described configuration, it is preferable that the following conditional expression (4) is satisfied:

$$-2.45<r2/r4<-0.45 \quad (4)$$

where r2: a paraxial curvature radius of an image-side surface of the first lens, and r4: a paraxial curvature radius of an image-side surface of the second lens.

The conditional expression (4) defines an appropriate range of a relationship between the paraxial curvature radius of the image-side surface of the first lens and the paraxial curvature radius of the image-side surface of the second lens. By satisfying the conditional expression (4), refractive powers of the image-side surface of the first lens and the image-side surface of the second lens are suppressed from being excessive. As a result, reduction in the profile can be achieved, and the astigmatism and the distortion can be properly corrected.

According to the imaging lens having the above-described configuration, it is preferable that the following conditional expression (5) is satisfied:

$$0.65<r1/f<4.00 \quad (5)$$

where r1: a paraxial curvature radius of an object-side surface of the first lens, and f: a focal length of the overall optical system of the imaging lens.

The conditional expression (5) defines an appropriate range of the paraxial curvature radius of the object-side surface of the first lens. When a value is below the upper limit of the conditional expression (5), the coma aberration and the astigmatism can be properly corrected. Furthermore, the thickness along the optical axis of the sixth lens is prevented from being too large, and reduction in the profile is achieved. On the other hand, when the value is above the lower limit of the conditional expression (5), the spherical aberration and the distortion can be properly corrected.

According to the imaging lens having the above-described configuration, it is preferable that the following conditional expression (6) is satisfied:

$$0.80<r12/D6<3.00 \quad (6)$$

where r12: a paraxial curvature radius of an image-side surface of the sixth lens, and D6: a thickness along the optical axis of the sixth lens.

The conditional expression (6) defines an appropriate range of a relationship between the paraxial curvature radius of the image-side surface of the sixth lens and the thickness along the optical axis of the sixth lens. By satisfying the conditional expression (6), refractive power of the image-side surface of the sixth lens can be maintained, and the thickness along the optical axis of the sixth lens can be secured. As a result, the astigmatism, the field curvature and the distortion can be suppressed, and the formability of the sixth lens is improved.

According to the imaging lens having the above-described configuration, it is preferable that the following conditional expression (7) is satisfied:

$$14.00 < vd6 < 36.00 \tag{7}$$

where vd6: an abbe number at d-ray of the sixth lens.

The conditional expression (7) defines an appropriate range of the abbe number at d-ray of the sixth lens. By satisfying the conditional expression (7), the chromatic aberration can be properly corrected.

According to the imaging lens having the above-described configuration, it is preferable that the following conditional expression (8) is satisfied:

$$-10.00 < (D1/f1) \times 100 < -1.00 \tag{8}$$

where

D1: a thickness along the optical axis of the first lens, and f1: a focal length of the first lens.

The conditional expression (8) defines an appropriate range of a relationship between the thickness along the optical axis of the first lens and the focal length of the first lens. When a value is below the upper limit of the conditional expression (8), the thickness along the optical axis of the first lens is prevented from being too small, and the formability of the lens is improved. Furthermore, refractive power of the first lens is prevented from being too small, and the chromatic aberration can be properly corrected. On the other hand, when the value is above the lower limit of the conditional expression (8), the thickness along the optical axis of the first lens is prevented from being too large, and reduction in the profile can be achieved. Furthermore, refractive power of the first lens is prevented from being too large, and the coma aberration, the astigmatism and the distortion can be properly corrected.

According to the imaging lens having the above-described configuration, it is preferable that the following conditional expression (9) is satisfied:

$$0.90 < D2/D3 < 4.70 \tag{9}$$

where

D2: a thickness along the optical axis of the second lens, and

D3: a thickness along the optical axis of the third lens.

The conditional expression (9) defines an appropriate range of a relationship between the thickness along the optical axis of the second lens and the thickness along the optical axis of the third lens. By satisfying the conditional expression (9), the thicknesses along the optical axis of the second lens and the third lens can be appropriately balanced. As a result, reduction in the profile is achieved, and the formability of the second lens and the third lens is improved. In addition, by satisfying the conditional expression (9), the astigmatism and the distortion can be properly corrected.

According to the imaging lens having the above-described configuration, it is preferable that the following conditional expression (10) is satisfied:

$$0.30 < f4/f < 1.70 \tag{10}$$

where f4: a focal length of the fourth lens, and f: a focal length of the overall optical system of the imaging lens.

The conditional expression (10) defines an appropriate range of refractive power of the fourth lens. When a value is below the upper limit of the conditional expression (10), the positive refractive power of the fourth lens becomes appropriate, and reduction in the profile can be achieved. On the other hand, when the value is above the lower limit of the conditional expression (10), the spherical aberration, the astigmatism and the distortion can be properly corrected.

According to the imaging lens having the above-described configuration, it is preferable that the following conditional expression (11) is satisfied:

$$-10.00 < f1/f4 < -0.80 \tag{11}$$

where f1: a focal length of the first lens, and f4: a focal length of the fourth lens.

The conditional expression (11) defines an appropriate range of a relationship between the focal length of the first lens and the focal length of the fourth lens. By satisfying the conditional expression (11), refractive powers of the first lens and the fourth lens can be appropriately balanced. As a result, reduction in the profile can be achieved, and the chromatic aberration, the coma aberration, the astigmatism and the distortion can be properly corrected.

According to the imaging lens having the above-described configuration, it is preferable that the following conditional expression (12) is satisfied:

$$0.40 < f1/f6 < 9.00 \tag{12}$$

where f1: a focal length of the first lens, and f6: a focal length of the sixth lens.

The conditional expression (12) defines an appropriate range of a relationship between the focal length of the first lens and the focal length of the sixth lens. By satisfying the conditional expression (12), refractive powers of the first lens and the sixth lens can be appropriately balanced. As a result, the chromatic aberration, the coma aberration, the astigmatism, the field curvature and the distortion can be properly corrected.

According to the imaging lens having the above-described configuration, it is preferable that the following conditional expression (13) is satisfied:

$$|r3|/r4 < -1.50 \tag{13}$$

where r3: a paraxial curvature radius of an object-side surface of the second lens, and r4: a paraxial curvature radius of an image-side surface of the second lens, and The conditional expression (13) defines an appropriate range of a relationship between the paraxial curvature radius of the object-side surface of the second lens and the paraxial curvature radius of the image-side surface of the second lens. By satisfying the conditional expression (13), refractive powers of the object-side surface of the second lens and the image-side surface of the second lens can be appropriately balanced. As a result, the astigmatism and the distortion can be properly corrected.

According to the imaging lens having the above-described configuration, it is preferable that the following conditional expression (14) is satisfied:

$$-1.10 < r2/r4/r6 < -0.10 \tag{14}$$

where
- r2: a paraxial curvature radius of an image-side surface of the first lens,
- r4: a paraxial curvature radius of an image-side surface of the second lens, and
- r6: a paraxial curvature radius of an image-side surface of the third lens.

The conditional expression (14) defines an appropriate range of a relationship among the paraxial curvature radius of the image-side surface of the first lens, the paraxial curvature radius of the image-side surface of the second lens, and the paraxial curvature radius of the image-side surface of the third lens. By satisfying the conditional expression (14), refractive powers of the image-side surfaces of the first lens, the second lens and the third lens, respectively can be appropriately balanced. As a result, the coma aberration, the astigmatism and the distortion can be properly corrected.

According to the imaging lens having the above-described configuration, it is preferable that the following conditional expression (15) is satisfied:

$$30.00 < r2/T2 \qquad (15)$$

where
- r2: a paraxial curvature radius of an image-side surface of the first lens, and
- T2: a distance along the optical axis from an image-side surface of the second lens to an object-side surface of the third lens.

The conditional expression (15) defines an appropriate range of a relationship between the paraxial curvature radius of the image-side surface of the first lens and the distance along the optical axis from the image-side surface of the second lens to the object-side surface of the third lens. By satisfying the conditional expression (15), the wide field of view can be achieved, a light ray incident angle to the object-side surface of the second lens can be appropriately controlled, and the astigmatism and the distortion can be properly corrected.

According to the imaging lens having the above-described configuration, it is preferable that the following conditional expression (16) is satisfied:

$$-0.90 < r4/f < -0.20 \qquad (16)$$

where
- r4: a paraxial curvature radius of an image-side surface of the second lens, and
- f: a focal length of the overall optical system of the imaging lens.

The conditional expression (16) defines an appropriate range of the paraxial curvature radius of the image-side surface of the second lens. When a value is below the upper limit of the conditional expression (16), the spherical aberration and the distortion can be properly corrected. On the other hand, when the value is above the lower limit of the conditional expression (16), the astigmatism can be properly corrected.

According to the imaging lens having the above-described configuration, it is preferable that the following conditional expression (17) is satisfied:

$$0.90 < |r7|/f < 20.00 \qquad (17)$$

where
- r7: a paraxial curvature radius of an object-side surface of the fourth lens, and
- f: a focal length of the overall optical system of the imaging lens.

The conditional expression (17) defines an appropriate range of the paraxial curvature radius of the object-side surface of the fourth lens. By satisfying the conditional expression (17), the astigmatism and the distortion can be properly corrected.

According to the imaging lens having the above-described configuration, it is preferable that the following conditional expression (18) is satisfied:

$$-0.80 < r8/f < -0.15 \qquad (18)$$

where
- r8: a paraxial curvature radius of an image-side surface of the fourth lens, and
- f: a focal length of the overall optical system of the imaging lens.

The conditional expression (18) defines an appropriate range of the paraxial curvature radius of the image-side surface of the fourth lens. By satisfying the conditional expression (18), the astigmatism and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11, 13, 15, 17, 19 and 21 are schematic views of the imaging lenses in Examples 1 to 11 according to the embodiments of the present invention, respectively.

The imaging lens according to the present invention comprises, in order from an object side to an image side, a first lens L1 with negative refractive power having an object-side surface being convex in a paraxial region, a second lens L2 with positive refractive power in a paraxial region, a third lens L3 with the negative refractive power in a paraxial region, a fourth lens L4 with the positive refractive power in a paraxial region, a fifth lens L5 having a flat object-side surface and a flat image-side surface that are aspheric, and a sixth lens L6 with the negative refractive power having an image-side surface being concave in a paraxial region.

A filter IR such as an IR cut filter or a cover glass is arranged between the sixth lens L6 and an image plane IMG (namely, the image plane of an image sensor). The filter IR is omissible.

An aperture stop ST is arranged between the first lens L1 and the second lens L2, and correction of aberrations and control of an incident angle of a light ray of high image height to an image sensor become facilitated.

The first lens L1 has the negative refractive power and is formed in a meniscus shape having the object-side surface being convex and an image-side surface being concave in a paraxial region (near the optical axis X). Therefore, a wide field of view is achieved, and spherical aberration, coma aberration, astigmatism and distortion are properly corrected.

The second lens L2 has the positive refractive power and is formed in a biconvex shape having an object-side surface and an image-side surface being both convex in the paraxial region. Therefore, reduction in the profile is achieved, and the astigmatism and the distortion are properly corrected.

Figure 15:
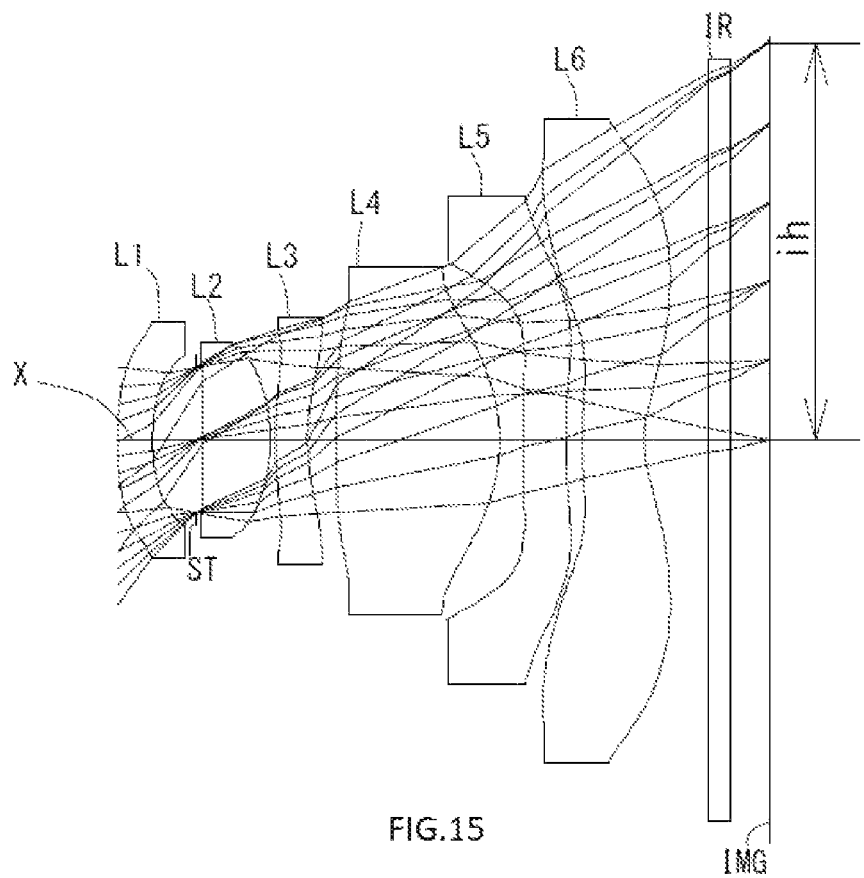
FIG. 15 is a schematic view showing an imaging lens in Example 8 according to the present invention.

The second lens L2 may be formed in a meniscus shape having the object-side surface being concave and the image-side surface being convex in the paraxial region (near the optical axis X) as in the Example 8 shown in FIG. 15. In this case, a light ray incident angle to the second lens L2 can be appropriately controlled, and the distortion can be properly corrected.

The third lens L3 has the negative refractive power and is formed in a meniscus shape having the object-side surface being convex and an image-side surface being concave in a paraxial region (near the optical axis X). Therefore, the chromatic aberration, the spherical aberration, the astigmatism and the distortion are properly corrected.

Figure 19:
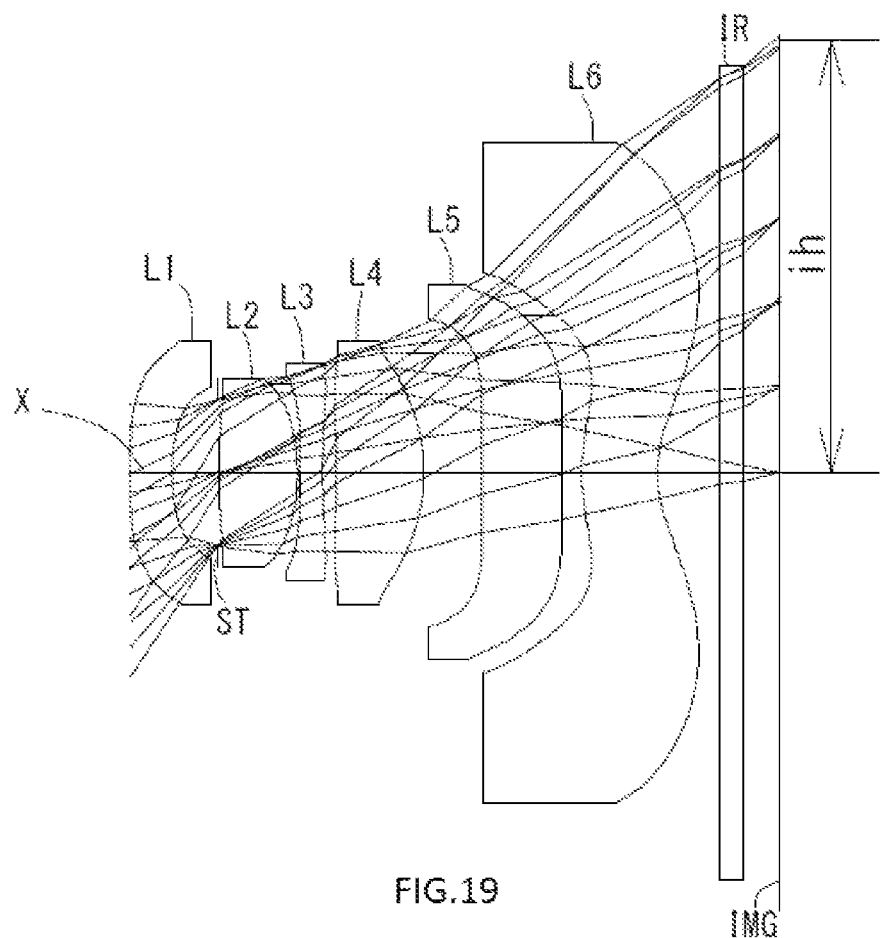
FIG. 19 is a schematic view showing an imaging lens in Example 10 according to the present invention.
Figure 21:
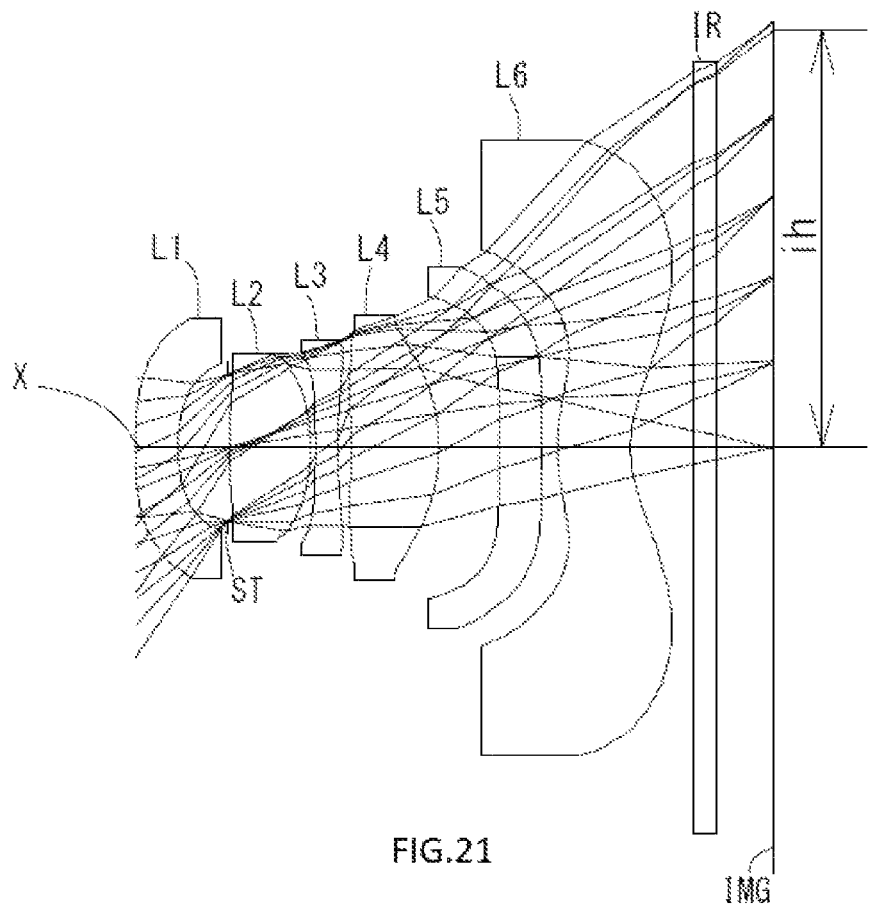
FIG. 21 is a schematic view showing an imaging lens in Example 11 according to the present invention.

The third lens L3 may be formed in a biconcave shape having the object-side surface and the image-side surface being both concave in the paraxial region as in the Examples 10 and 11 shown in FIGS. 19 and 21. This case is favorable for correcting the chromatic aberration due to the negative refractive powers on both sides.

The fourth lens L4 has the positive refractive power and is formed in a meniscus shape having an object-side surface being concave and an image-side surface being convex in a paraxial region (near the optical axis X). Therefore, reduction in a profile is achieved, and the astigmatism and the distortion are properly corrected.

Figure 13:
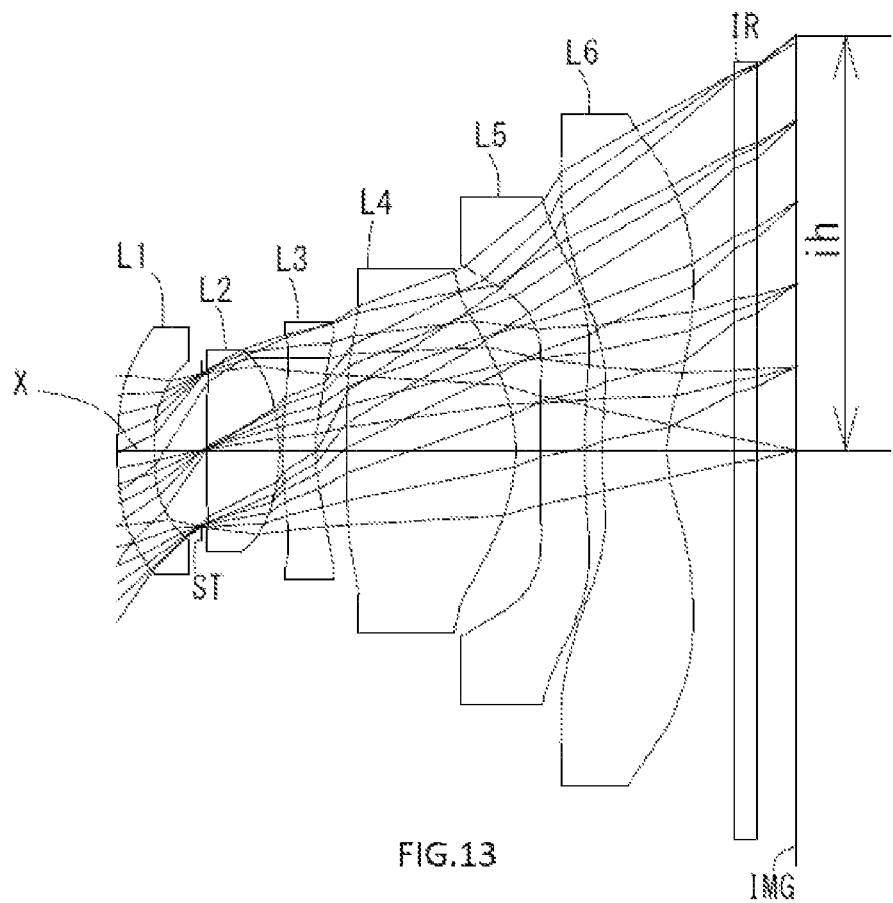
FIG. 13 is a schematic view showing an imaging lens in Example 7 according to the present invention.
Figure 17:
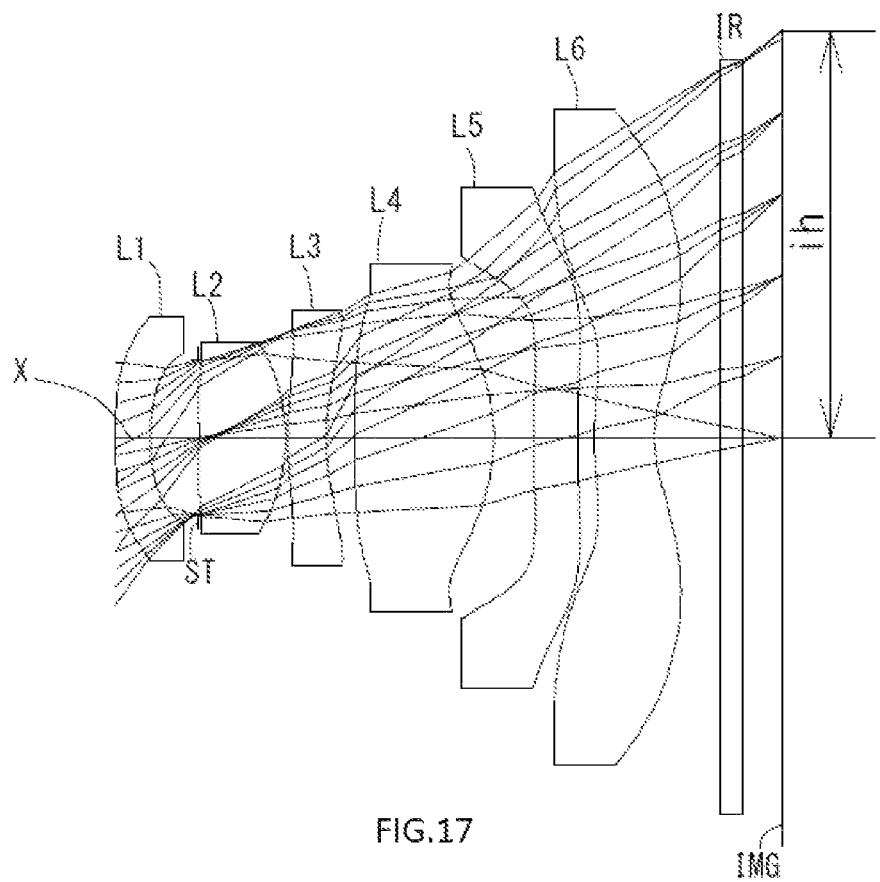
FIG. 17 is a schematic view showing an imaging lens in Example 9 according to the present invention.

The fourth lens L4 may be formed in the biconvex shape having the object-side surface and the image-side surface being both convex in the paraxial region as in the Examples 7, 8 and 9 shown in FIGS. 13, 15 and 17. This case is favorable for reduction in the profile due to the positive refractive powers on both sides.

The fifth lens L5 substantially has no refractive power, and is formed in a shape having an object-side surface and an image-side surface that are flat in a paraxial region (near the optical axis X). Therefore, the astigmatism, the field curvature and the distortion are properly corrected by aspheric surfaces formed on both sides without affecting a focal length of the overall optical system of the imaging lens.

The sixth lens L6 has the negative refractive power and is formed in a meniscus shape having an object-side surface being convex and the image-side surface being concave in the paraxial region. Therefore, the chromatic aberration, the astigmatism, the distortion and the field curvature are properly corrected while securing a back focus.

Figure 3:
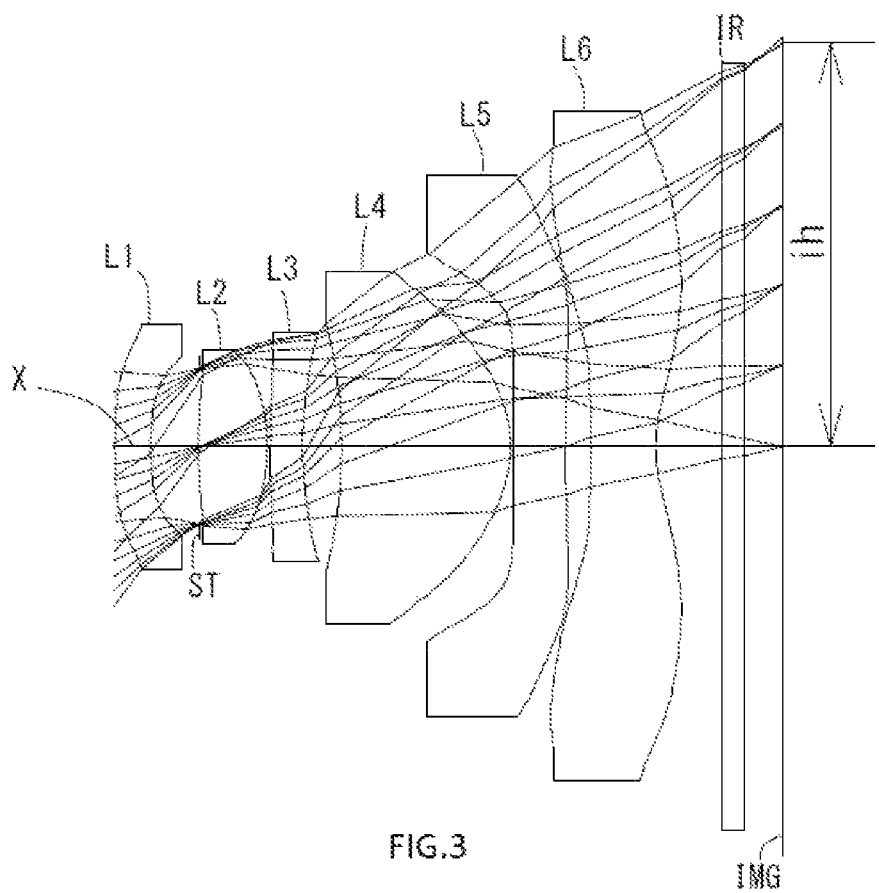
FIG. 3 is a schematic view showing an imaging lens in Example 2 according to the present invention.
Figure 7:
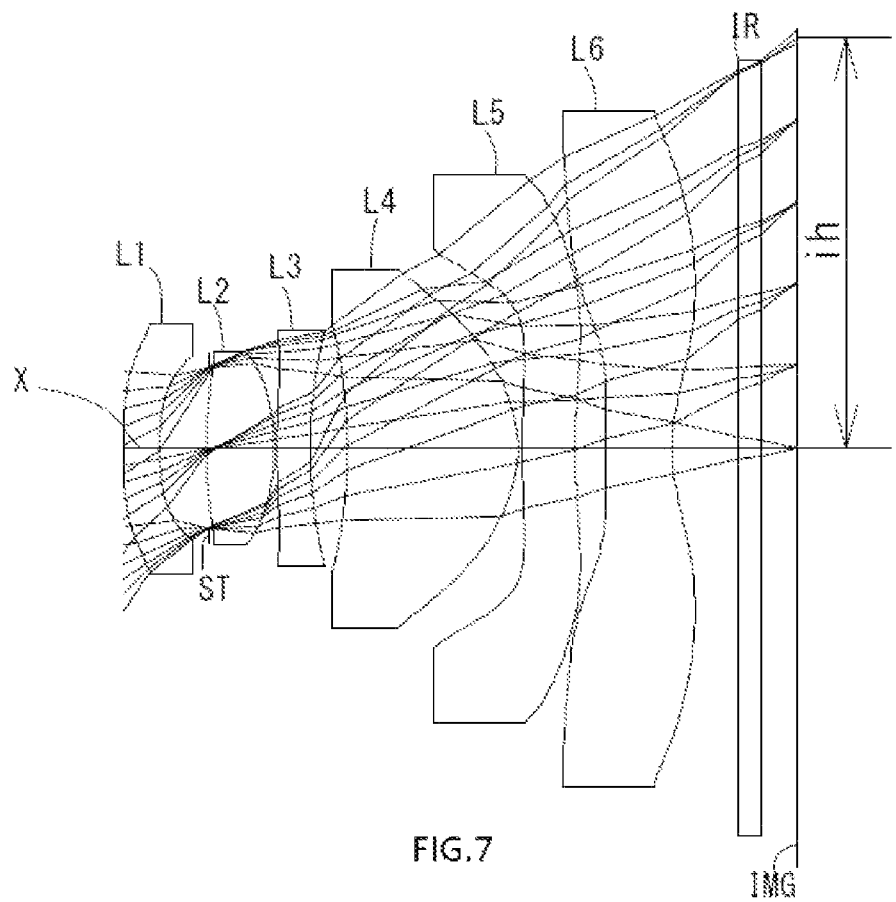
FIG. 7 is a schematic view showing an imaging lens in Example 4 according to the present invention.
Figure 9:
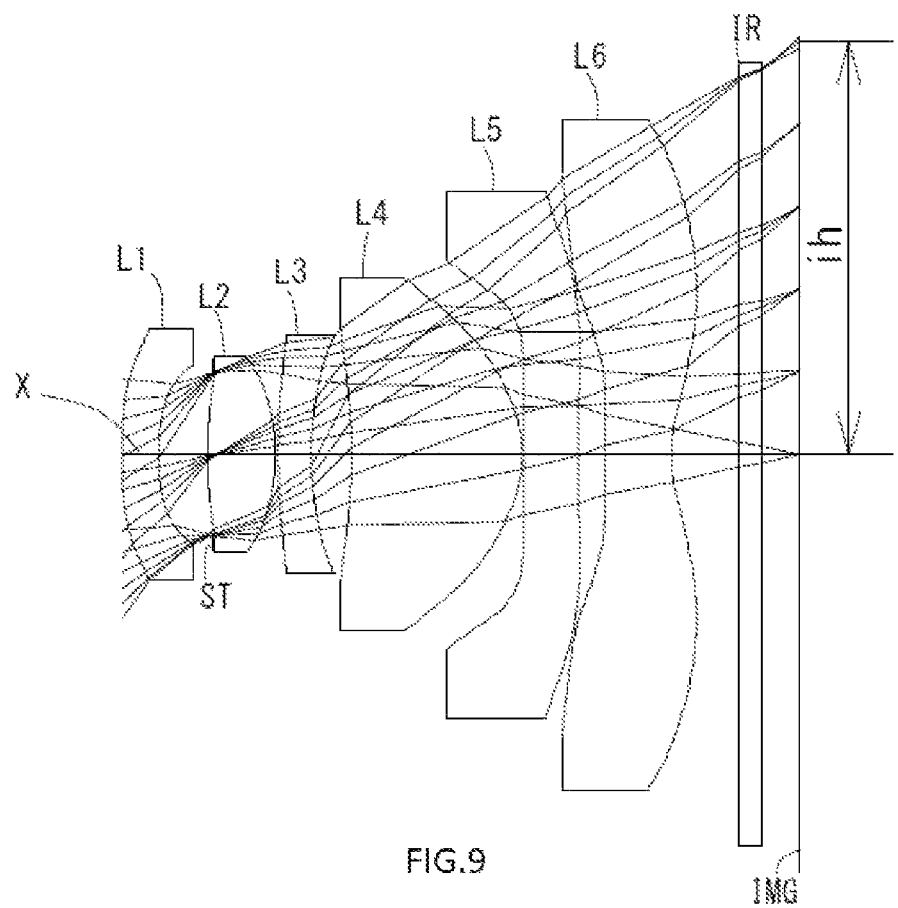
FIG. 9 is a schematic view showing an imaging lens in Example 5 according to the present invention.

The sixth lens L6 may be formed in a shape having the object-side surface being flat and the image-side surface being concave in the paraxial region as in the Examples 2, 4 and 5 shown in FIGS. 3, 7 and 9. In this case, the object-side surface is formed as an aspheric surface and properly corrects aberrations at a peripheral area.

The image-side surface of the sixth lens L6 is formed as the aspheric surface having at least one pole point in the position off the optical axis. Therefore, the field curvature and the distortion are more properly corrected and a light ray incident angle to the image sensor can be appropriately controlled.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (18).

$$-9.55 < (T1/f1) \times 100 < -1.00 \quad (1)$$

$$0.02 < T2/T3 < 0.60 \quad (2)$$

$$-15.50 < f6/D6 < -1.50 \quad (3)$$

$$-2.45 < r2/r4 < -0.45 \quad (4)$$

$$0.65 < r1/f < 4.00 \quad (5)$$

$$0.80 < r12/D6 < 3.00 \quad (6)$$

$$14.00 < vd6 < 36.00 \quad (7)$$

$$-10.00 < (D1/f1) \times 100 < -1.00 \quad (8)$$

$$0.90 < D2/D3 < 4.70 \quad (9)$$

$$0.30 < f4/f < 1.70 \quad (10)$$

$$-10.00 < f1/f4 < -0.80 \quad (11)$$

$$0.40 < f1/f6 < 9.00 \quad (12)$$

$$|r3|/r4 < -1.50 \quad (13)$$

$$-1.10 < r2/r4/r6 < -0.10 \quad (14)$$

$$30.00 < r2/T2 \quad (15)$$

$$-0.90 < r4/f < -0.20 \quad (16)$$

$$0.90 < |r7|/f < 20.00 \quad (17)$$

$$-0.80 < r8/f < -0.15 \quad (18)$$

where
vd6: an abbe number at d-ray of the sixth lens L6,
D1: a thickness along the optical axis X of the first lens L1,
D2: a thickness along the optical axis X of the second lens L2,
D3: a thickness along the optical axis X of the third lens L3,
D6: a thickness along the optical axis X of the sixth lens L6,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4,
f: a focal length of the overall optical system of the imaging lens,
f1: a focal length of the first lens L1,
f4: a focal length of the fourth lens L4,
f6: a focal length of the sixth lens L6,
r1: a paraxial curvature radius of an object-side surface of the first lens L1,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r6: a paraxial curvature radius of an image-side surface of the third lens L3,
r7: a paraxial curvature radius of an object-side surface of the fourth lens L4,
r8: a paraxial curvature radius of an image-side surface of the fourth lens L4, and
r12: a paraxial curvature radius of an image-side surface of the sixth lens L6.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (18a).

$$-8.75 < (T1/f1) \times 100 < -1.70 \quad (1a)$$

$$0.03 < T2/T3 < 0.50 \quad (2a)$$

$$-14.00 < f6/D6 < -2.50 \quad (3a)$$

$$-2.15 < r2/r4 < -0.75 \quad (4a)$$

$$0.95 < r1/f < 3.50 \quad (5a)$$

$$1.20 < r12/D6 < 2.75 \quad (6a)$$

$$19.00 < vd6 < 31.00 \quad (7a)$$

$$-8.50 < (D1/f1) \times 100 < -1.70 \quad (8a)$$

$$1.40 < D2/D3 < 4.15 \quad (9a)$$

$$0.50 < f4/f < 1.45 \quad (10a)$$

$$-8.50 < f1/f4 < -1.30 \quad (11a)$$

$$0.60 < f1/f6 < 7.50 \quad (12a)$$

$$-2000.00 < |r3|/r4 < -2.00 \quad (13a)$$

$$-0.95 < r2/r4/r6 < -0.20 \quad (14a)$$

$$36.00 < r2/T2 < 220.00 \quad (15a)$$

$$-0.80 < r4/f < -0.35 \quad (16a)$$

$$1.05 < |r7|/f < 16.50 \quad (17a)$$

$$-0.70 < r8/f < -0.20 \quad (18a)$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 +$$

$$A_{10}H^{10} + A_{12}H^{12} + A_{14}H^{14} + A_{16}H^{16} + A_{18}H^{18} + A_{20}H^{20}$$

[Equation 1]

Next, examples of the imaging lens according to this embodiment will be explained. In each example, f denotes a focal length of the overall optical system of the imaging lens, Fno denotes an F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 3.12
Fno = 2.20
ω(°) = 54.2
ih = 3.69
TTL = 6.03

Surface Data

| i | r | d | Nd | vd | |
|---|---|---|---|---|---|
| (Object) | Infinity | Infinity | | | |
| 1* | 10.2353 | 0.3275 | 1.535 | 55.69 | (vd1) |
| 2* | 3.6473 | 0.4406 | | | |
| 3 (Stop) | Infinity | −0.0159 | | | |
| 4* | 5.3142 | 0.6582 | 1.544 | 56.44 | (vd2) |
| 5* | −2.0154 | 0.0250 | | | |
| 6* | 7.9402 | 0.3000 | 1.671 | 19.24 | (vd3) |
| 7* | 4.2063 | 0.3461 | | | |
| 8* | −3.9091 | 1.5399 | 1.535 | 55.69 | (vd4) |
| 9* | −1.1129 | 0.0200 | | | |
| 10* | Infinity | 0.4800 | 1.671 | 19.24 | (vd5) |
| 11* | Infinity | 0.2074 | | | |
| 12* | 52.8029 | 0.5950 | 1.639 | 23.52 | (vd6) |
| 13* | 1.4084 | 0.6000 | | | |
| 14 | Infinity | 0.2100 | 1.517 | 64.20 | |
| 15 | Infinity | 0.3660 | | | |
| Image Plane | Infinity | | | | |

Constituent Lens Data

| Lens | Start Surface | Focal Length |
|---|---|---|
| 1 | 1 | −10.782 |
| 2 | 4 | 2.772 |
| 3 | 6 | −13.780 |
| 4 | 8 | 2.441 |
| 5 | 10 | Infinity |
| 6 | 12 | −2.274 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 3.352432E+00 | 0.000000E+00 | 0.000000E+00 |
| A4 | 2.325862E−01 | 3.623732E−01 | 4.255530E−02 | 2.727508E−02 | −4.321598E−02 | −2.631253E−02 |
| A6 | −2.513251E−01 | 4.834690E−01 | 1.685821E−01 | −8.085160E−02 | −2.004599E−01 | −8.695072E−02 |
| A8 | 5.574211E−01 | −6.726708E+00 | −2.420891E+00 | −2.486008E−01 | 1.245619E+00 | 6.359088E−01 |
| A10 | −1.013013E+00 | 4.096610E+01 | 1.514657E+01 | 3.566336E+00 | −3.816831E+00 | −2.271959E+00 |
| A12 | 1.168958E+00 | −1.419207E+02 | −5.967941E+01 | −1.418810E+01 | 6.710570E+00 | 5.339424E+00 |
| A14 | −8.018291E−01 | 2.960142E+02 | 1.458621E+02 | 2.716480E+01 | −6.859220E+00 | −7.868807E+00 |
| A16 | 2.778602E−01 | −3.643902E+02 | −2.206580E+02 | −2.817735E+01 | 3.217351E+00 | 6.957355E+00 |
| A18 | −3.591368E−02 | 2.411476E+02 | 1.887798E+02 | 1.519842E+01 | 1.353103E−01 | −3.388052E+00 |
| A20 | 0.000000E+00 | −6.589510E+01 | −7.051571E+01 | −3.323277E+00 | −4.431477E−01 | 7.048022E−01 |

| | Eighth Surface | Ninth Surface | Tenth Surface | Eleventh Surface | Twelfth Surface | Thirteenth Surface |
|---|---|---|---|---|---|---|
| k | 6.459315E+00 | −2.161948E+00 | −1.000000E+00 | −1.000000E+00 | 0.000000E+00 | −1.999515E+00 |
| A4 | 2.191976E−02 | 8.631297E−02 | 1.072455E−01 | 1.014908E−01 | 1.606620E−03 | −1.933624E−01 |
| A6 | 1.846987E−01 | −3.566491E−01 | −2.393029E−01 | −8.507572E−02 | −1.709663E−01 | 9.178584E−02 |

TABLE 1-continued

Example 1
Unit mm
f = 3.12
Fno = 2.20
ω(°) = 54.2
h = 3.69
TTL = 6.03

| | | | | | | |
|---|---|---|---|---|---|---|
| A8  | −1.126066E+00 | 5.894754E−01  | 3.349210E−01  | 5.880160E−03  | 1.657906E−01  | −2.856878E−02 |
| A10 | 3.548046E+00  | −6.434634E−01 | −3.791901E−01 | 1.703467E−02  | −7.560831E−02 | 6.206038E−03 |
| A12 | −7.049203E+00 | 4.439033E−01  | 2.717923E−01  | −9.021905E−03 | 2.019699E−02  | −9.575844E−04 |
| A14 | 8.880110E+00  | −1.856635E−01 | −1.224967E−01 | 2.218628E−03  | −3.352310E−03 | 1.029937E−04 |
| A16 | −6.803972E+00 | 4.262029E−02  | 3.333358E−02  | −3.009690E−04 | 3.422422E−04  | −7.342835E−06 |
| A18 | 2.896992E+00  | −3.966757E−03 | 4.907366E−03  | 2.179721E−05  | −1.976054E−05 | 3.104657E−07 |
| A20 | −5.284937E−01 | 4.000000E−05  | 2.958057E−04  | −6.629573E−07 | 4.950699E−07  | −5.819162E−09 |

The imaging lens in Example 1 satisfies conditional expressions (1) to (18) as shown in Table 12.

Figure 1:
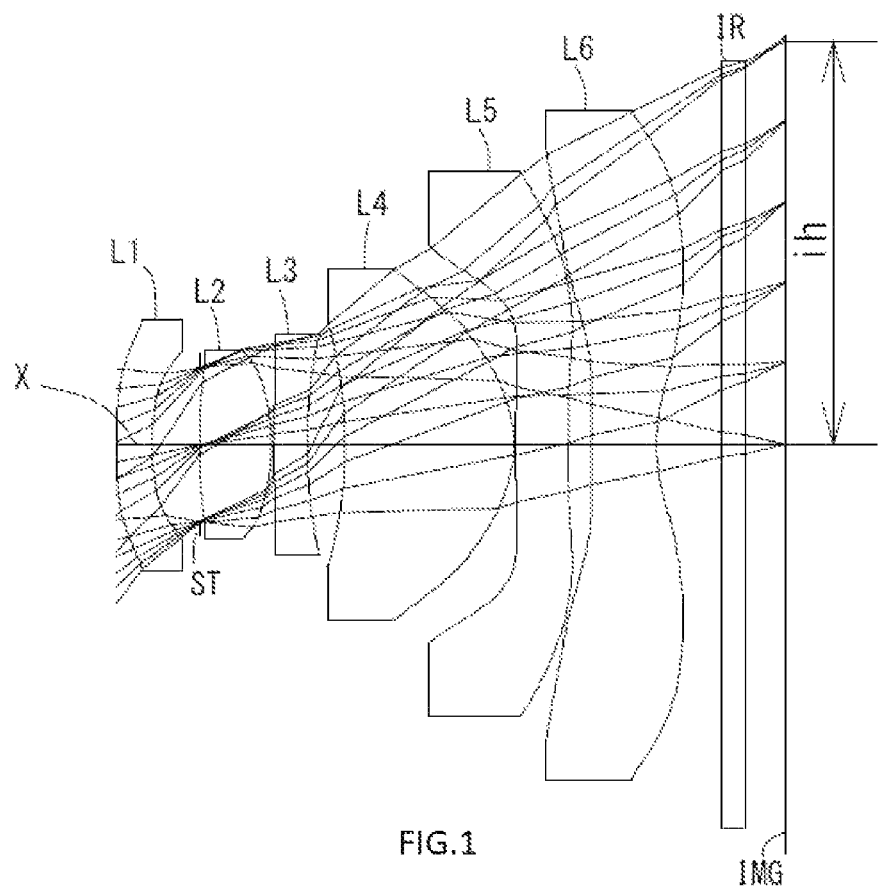
FIG. 1 is a schematic view showing an imaging lens in Example 1 according to the present invention.
Figure 2:
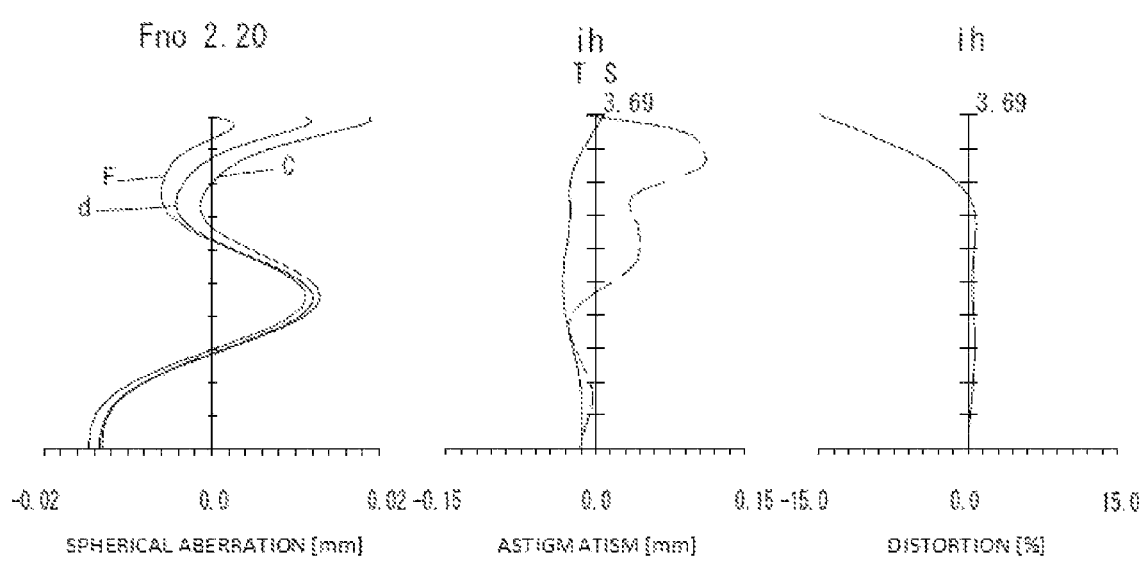
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, 10, 12, 14, 16, 18, 20 and 22). As shown in FIG. 2, each aberration is corrected excellently.

Example 2

The basic lens data is shown below in Table 2.

TABLE 2

Example 2
Unit mm
f = 3.12
Fno = 2.20
ω(°) = 53.9
h = 3.69
TTL = 6.03

Surface Data

| i | r | d | Nd | vd | |
|---|---|---|---|---|---|
| (Object) | Infinity | Infinity | | | |
| 1* | 7.8510 | 0.3275 | 1.535 | 55.69 | (vd1) |
| 2* | 3.2018 | 0.4457 | | | |
| 3 (Stop) | Infinity | −0.0087 | | | |
| 4* | 6.3718 | 0.6250 | 1.544 | 56.44 | (vd2) |
| 5* | −1.8016 | 0.0250 | | | |
| 6* | 7.1980 | 0.3000 | 1.671 | 19.24 | (vd3) |
| 7* | 3.6626 | 0.3576 | | | |
| 8* | −3.8709 | 1.5400 | 1.535 | 55.69 | (vd4) |
| 9* | −1.1160 | 0.0200 | | | |
| 10* | Infinity | 0.4850 | 1.671 | 19.24 | (vd5) |
| 11* | Infinity | 0.2227 | | | |
| 12* | Infinity | 0.5950 | 1.639 | 23.52 | (vd6) |
| 13* | 1.4622 | 0.6000 | | | |
| 14 | Infinity | 0.2100 | 1.517 | 64.20 | |
| 15 | Infinity | 0.3549 | | | |
| Image Plane | Infinity | | | | |

Constituent Lens Data

| Lens | Start Surface | Focal Length |
|---|---|---|
| 1 | 1 | −10.364 |
| 2 | 4 | 2.651 |
| 3 | 6 | −11.510 |
| 4 | 8 | 2.454 |
| 5 | 10 | Infinity |
| 6 | 12 | −2.288 |

Aspheric Surface Data

| | First Surface | Second Surface | Fourth Surface | Fifth Surface | Sixth Surface | Seventh Surface |
|---|---|---|---|---|---|---|
| k  | 0.000000E+00 | 0.000000E+00 | 0.000000E+00 | 2.473573E+00 | 0.000000E+00  | 0.000000E+00 |
| A4 | 2.109559E−01 | 4.153751E−01 | 3.074407E−02 | 4.041213E−02 | −3.722932E−02 | −5.008506E−03 |

TABLE 2-continued

Example 2
Unit mm
f = 3.12
Fno = 2.20
ω(°) = 53.9
h = 3.69
TTL = 6.03

| | | | | | | |
|---|---|---|---|---|---|---|
| A6  | −9.996069E−02 | −5.307388E−01 | 1.738292E−01  | −9.343469E−02 | −1.692019E−01 | −2.926844E−01 |
| A8  | 3.197735E−02  | 3.999971E+00  | −2.426969E+00 | −2.260110E−01 | 7.633633E−01  | 1.536549E+00  |
| A10 | 4.880749E−02  | −2.051096E+01 | 1.513127E+01  | 3.595489E+00  | −1.476089E+00 | −4.611298E+00 |
| A12 | −6.589971E−02 | 6.966191E+01  | −5.938473E+01 | −1.411085E+01 | 8.047677E−01  | 8.983680E+00  |
| A14 | 1.306139E−02  | −1.496420E+02 | 1.459166E+02  | 2.714450E+01  | 2.035010E+00  | −1.117778E+01 |
| A16 | 0.000000E+00  | 1.997098E+02  | −2.208024E+02 | −2.825823E+01 | −4.591255E+00 | 8.541977E+00  |
| A18 | 0.000000E+00  | −1.522685E+02 | 1.864242E+02  | 1.492937E+01  | 3.715795E+00  | −3.669728E+00 |
| A20 | 0.000000E+00  | 5.011105E+01  | −6.700158E+01 | −2.982966E+00 | −1.088551E+00 | 6.844890E−01  |

| | Eighth Surface | Ninth Surface | Tenth Surface | Eleventh Surface | Twelfth Surface | Thirteenth Surface |
|---|---|---|---|---|---|---|
| k   | 4.527758E+00  | −2.205091E+00 | −1.000000E+00 | −1.000000E+00 | −1.000000E+00 | −2.023880E+00 |
| A4  | 9.668611E−02  | 8.548945E−03  | 3.217041E−02  | 3.737819E−02  | −3.325624E−02 | −1.944026E−01 |
| A6  | −4.633080E−01 | −1.345910E−01 | −1.091984E−01 | −1.435689E−02 | −9.159388E−02 | 1.086581E−01  |
| A8  | 2.027464E+00  | 2.698446E−01  | 2.622850E−01  | −5.346930E−03 | 9.535486E−02  | −4.571624E−02 |
| A10 | −5.376142E+00 | −3.552407E−01 | −4.139450E−01 | −8.090790E−04 | −4.229972E−02 | 1.380227E−02  |
| A12 | 8.577275E+00  | 2.741682E−01  | 3.616446E−01  | 2.743274E−03  | 1.076470E−02  | −2.829624E−03 |
| A14 | −8.323212E+00 | −1.204685E−01 | −1.888377E−01 | −1.111915E−03 | −1.686329E −03 | 3.798677E−04 |
| A16 | 4.788903E+00  | 2.668885E−02  | 5.764007E−02  | 2.067049E−04  | 1.615808E−04  | −3.192022E−05 |
| A18 | −1.476156E+00 | −1.652235E−03 | −9.350407E−03 | −1.904782E−05 | −8.726946E−06 | 1.523866E−06  |
| A20 | 1.799973E−01  | −1.985994E−04 | 6.181038E−04  | 7.043271E−07  | 2.041658E−07  | −3.153581E−08 |

The imaging lens in Example 2 satisfies conditional expressions (1) to (18) as shown in Table 12.

Figure 4:
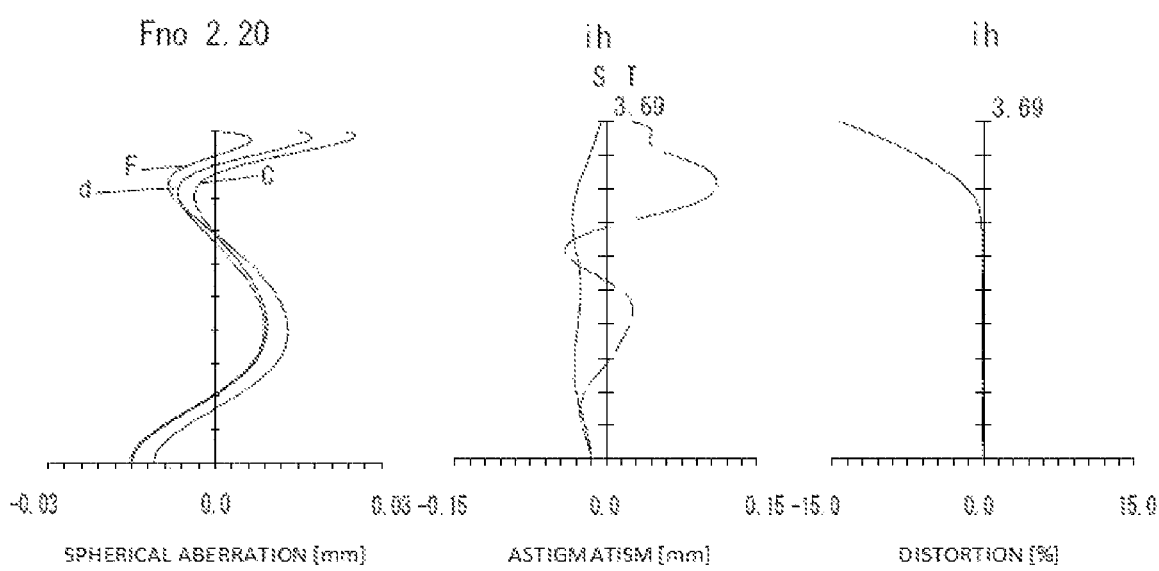
FIG. 4 shows spherical aberration, astigmatism, and distortion of the imaging lens in Example 2 according to the present invention.
Figure 5:
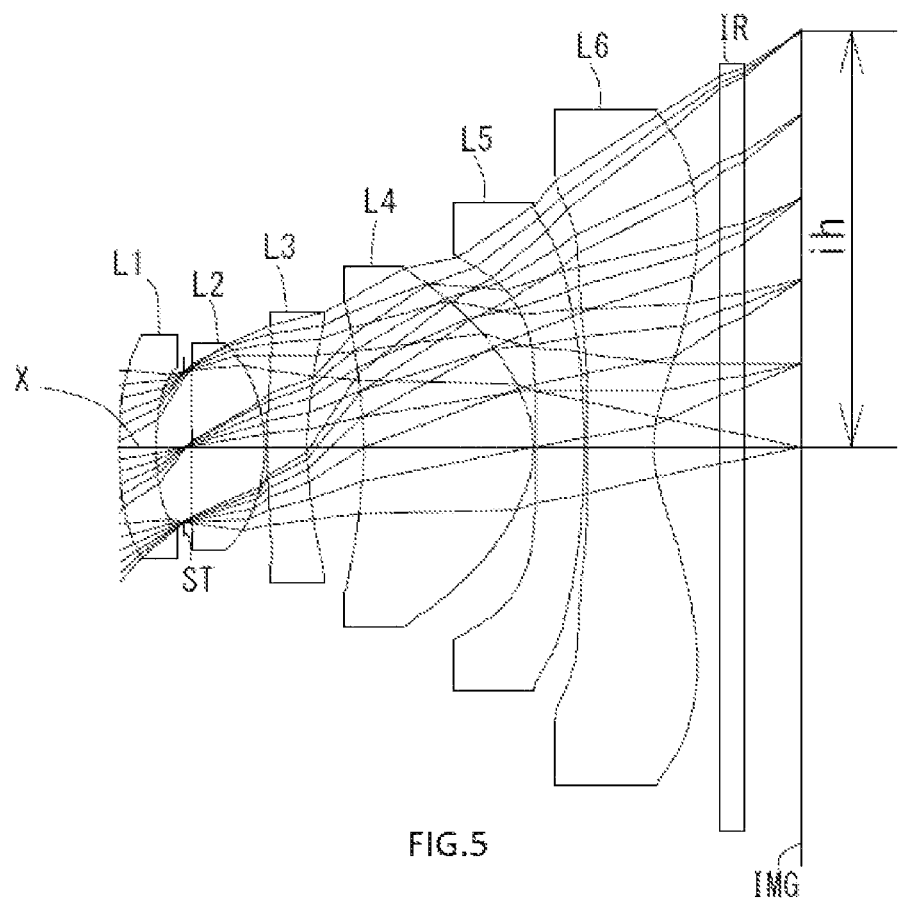
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 3.12
Fno = 2.20
ω(°) = 50.0
h = 3.71
TTL = 6.03

Surface Data

| i | r | d | Nd | vd | |
|---|---|---|---|---|---|
| (Object)    | Infinity | Infinity |       |       |       |
| 1*          | 5.3214   | 0.3278   | 1.544 | 56.44 | (vd1) |
| 2*          | 3.0307   | 0.2553   |       |       |       |
| 3 (Stop)    | Infinity | 0.0554   |       |       |       |
| 4*          | 32.6450  | 0.6592   | 1.544 | 56.44 | (vd2) |
| 5*          | −1.6170  | 0.0250   |       |       |       |
| 6*          | 6.0784   | 0.3570   | 1.671 | 19.24 | (vd3) |
| 7*          | 3.1607   | 0.5049   |       |       |       |
| 8*          | −3.8464  | 1.5210   | 1.535 | 55.69 | (vd4) |
| 9*          | −0.9635  | 0.0200   |       |       |       |
| 10*         | Infinity | 0.4300   | 1.671 | 19.24 | (vd5) |
| 11*         | Infinity | 0.0250   |       |       |       |
| 12*         | 9.8472   | 0.6000   | 1.639 | 23.52 | (vd6) |
| 13*         | 1.1590   | 0.6000   |       |       |       |
| 14          | Infinity | 0.2100   | 1.517 | 64.20 |       |
| 15          | Infinity | 0.5095   |       |       |       |
| Image Plane | Infinity |          |       |       |       |

TABLE 3-continued

Example 3
Unit mm
f = 3.12
Fno = 2.20
ω(°) = 50.0
h = 3.71
TTL = 6.03

Constituent Lens Data

| Lens | Start Surface | Focal Length |
|---|---|---|
| 1 | 1 | −13.618 |
| 2 | 4 | 2.849 |
| 3 | 6 | −10.324 |
| 4 | 8 | 2.030 |
| 5 | 10 | Infinity |
| 6 | 12 | −2.112 |

Aspheric Surface Data

| | First Surface | Second Surface | Fourth Surface | Fifth Surface | Sixth Surface | Seventh Surface |
|---|---|---|---|---|---|---|
| k   | 0.000000E+00  | 0.000000E+00  | 0.000000E+00  | 1.746410E+00  | 0.000000E+00  | 0.000000E+00 |
| A4  | 1.334792E−01  | 3.058968E−01  | −1.892492E−02 | 5.182789E−02  | −3.306989E−02 | −3.992342E−02 |
| A6  | 2.295601E−02  | −6.711145E−01 | 7.501182E−01  | −1.152750E−01 | −3.382294E−01 | −1.527517E−01 |
| A8  | −1.410818E−01 | 1.164009E+01  | −6.402318E+00 | −2.316585E−01 | 2.169433E+00  | 8.714041E−01 |
| A10 | 2.098748E−01  | −9.453852E+01 | 3.057669E+01  | 3.674273E+00  | −7.536808E+00 | −2.507971E+00 |
| A12 | −1.573520E−01 | 4.506956E+02  | −9.212110E+01 | −1.401578E+01 | 1.577996E+01  | 4.407528E+00 |
| A14 | 3.327820E−02  | −1.304299E+03 | 1.813253E+02  | 2.706647E+01  | −2.023681E+01 | −4.767566E+00 |
| A16 | 0.000000E+00  | 2.266727E+03  | −2.336367E+02 | −2.835258E+01 | 1.546434E+01  | 3.078450E+00 |
| A18 | 0.000000E+00  | −2.177051E+03 | 1.844469E+02  | 1.484522E+01  | −6.444942E+00 | −1.087050E+00 |
| A20 | 0.000000E+00  | 8.898162E+02  | −6.781784E+01 | −2.712445E+00 | 1.126122E+00  | 1.612894E−01 |

| | Eighth Surface | Ninth Surface | Tenth Surface | Eleventh Surface | Twelfth Surface | Thirteenth Surface |
|---|---|---|---|---|---|---|
| k   | 6.068304E+00  | −2.169597E+00 | −1.000000E+00 | −1.000000E+00 | −1.000000E+00 | −2.709576E+00 |
| A4  | 8.302080E−02  | −1.699599E−02 | −1.159580E−01 | −2.334144E−01 | −1.490019E−01 | −1.738828E−01 |
| A6  | −1.763536E−01 | 5.097816E−02  | 2.104862E−01  | 3.798851E−01  | 9.101145E−02  | 1.105296E−01 |
| A8  | 4.380733E−01  | −2.538521E−01 | −3.485017E−01 | −3.582282E−01 | −1.077048E−02 | 4.546267E−02 |
| A10 | −6.503338E−01 | 4.168812E−01  | 3.764438E−01  | 2.028115E−01  | −1.526325E−02 | 1.225291E−02 |
| A12 | 5.065726E−01  | −3.866123E−01 | −3.027884E−01 | −7.030909E−02 | 1.012611E−02  | −2.181352E−03 |
| A14 | −1.140486E−01 | 2.194066E−01  | 1.689337E−01  | 1.493835E−02  | −3.071605E−03 | 2.532548E−04 |
| A16 | −1.045050E−01 | −7.561782E−02 | −5.893149E−02 | −1.901549E−03 | 5.104658E−04  | −1.840207E−05 |
| A18 | 7.819471E−02  | 1.454651E−02  | 1.130000E−02  | 1.347087E−04  | −4.445113E−05 | 7.573144E−07 |
| A20 | −1.586302E−02 | −1.194801E−03 | −8.999264E−04 | 4.177995E−06  | 1.583500E−06  | −1.339804E−08 |

The imaging lens in Example 3 satisfies conditional expressions (1) to (18) as shown in Table 12.

Figure 6:
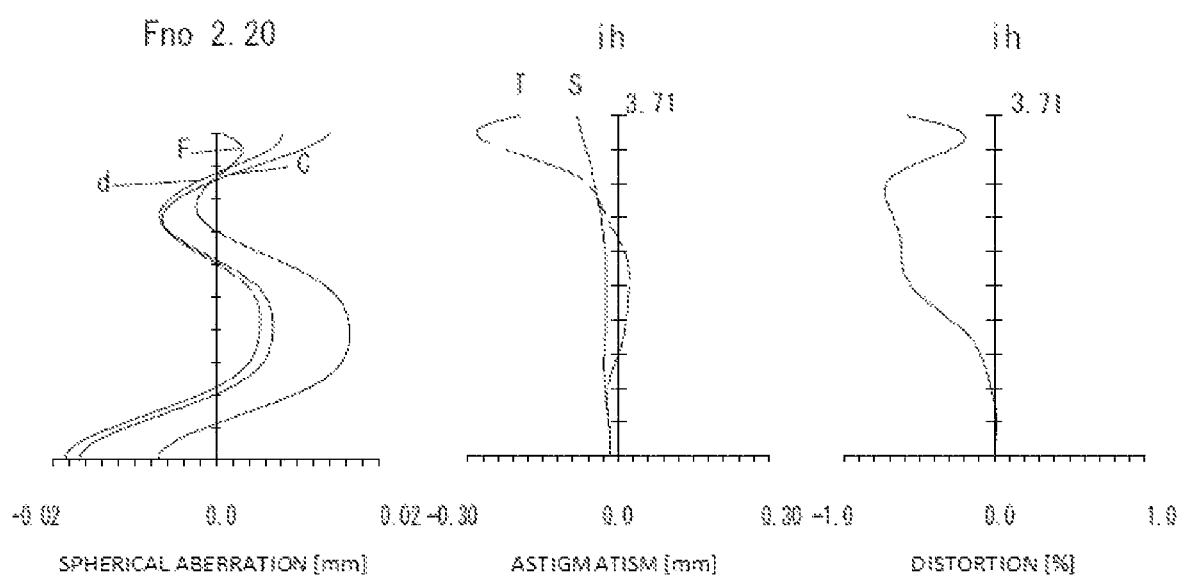
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 3.17
Fno = 2.20
ω(°) = 54.5
h = 3.71
TTL = 6.03

Surface Data

| i | r | d | Nd | vd | |
|---|---|---|---|---|---|
| (Object) | Infinity | Infinity | | | |
| 1* | 7.3609 | 0.3275 | 1.544 | 56.44 | (vd1) |
| 2* | 2.9795 | 0.4584 | | | |
| 3 (Stop) | Infinity | −0.0313 | | | |
| 4* | 5.2500 | 0.6115 | 1.544 | 56.44 | (vd2) |
| 5* | −1.9533 | 0.0250 | | | |
| 6* | 8.4074 | 0.3008 | 1.671 | 19.24 | (vd3) |
| 7* | 4.1966 | 0.3366 | | | |

TABLE 4-continued

Example 4
Unit mm
f = 3.17
Fno = 2.20
ω(°) = 54.5
h = 3.71
TTL = 6.03

| | | | | | |
|---|---|---|---|---|---|
| 8* | −4.2902 | 1.5400 | 1.535 | 55.69 | (vd4) |
| 9* | −1.1821 | 0.0444 | | | |
| 10* | Infinity | 0.4800 | 1.671 | 19.24 | (vd5) |
| 11* | Infinity | 0.2720 | | | |
| 12* | Infinity | 0.5950 | 1.639 | 23.52 | (vd6) |
| 13* | 1.4963 | 0.6000 | | | |
| 14 | Infinity | 0.2100 | 1.517 | 64.20 | |
| 15 | Infinity | 0.3300 | | | |
| Image Plane | Infinity | | | | |

Constituent Lens Data

| Lens | Start Surface | Focal Length |
|---|---|---|
| 1 | 1 | −9.443 |
| 2 | 4 | 2.695 |
| 3 | 6 | −12.861 |
| 4 | 8 | 2.602 |
| 5 | 10 | Infinity |
| 6 | 12 | −2.341 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 2.689220E+00 | 0.000000E+00 | 0.000000E+00 |
| A4 | 2.036369E−01 | 3.910997E−01 | 4.112876E−02 | 5.359177E−02 | −1.919698E−02 | 2.394079E−02 |
| A6 | −1.027382E−01 | −6.393995E−01 | 2.127359E−01 | −1.608627E−01 | −3.414510E−02 | −4.542385E−01 |
| A8 | −2.890132E−02 | 7.057725E+00 | −2.447244E+00 | −1.538920E−01 | −9.688873E−01 | 2.388292E+00 |
| A10 | 3.220201E−01 | −4.524275E+01 | 1.506254E+01 | 3.692266E+00 | 6.802519E+00 | −7.720657E+00 |
| A12 | −6.085406E−01 | 1.728866E+02 | −5.940363E+01 | −1.422307E+01 | −2.110755E+01 | 1.624816E+01 |
| A14 | 5.590523E−01 | −3.983390E+02 | 1.468708E+02 | 2.692309E+01 | 3.707169E+01 | −2.166674E+01 |
| A16 | −2.730913E−01 | 5.473822E+02 | −2.199139E+02 | −2.814618E+01 | −3.834899E+01 | 1.759052E+01 |
| A18 | 5.485350E−02 | −4.141953E+02 | 1.799968E+02 | 1.522085E+01 | 2.167325E+01 | −7.961630E+00 |
| A20 | 0.000000E+00 | 1.325204E+02 | −6.132163E+01 | −3.195518E+00 | −5.113873E+00 | 1.547077E+00 |

| | Eighth Surface | Ninth Surface | Tenth Surface | Eleventh Surface | Twelfth Surface | Thirteenth Surface |
|---|---|---|---|---|---|---|
| k | 6.669268E+00 | −2.114392E+00 | −1.000000E+00 | −1.000000E+00 | −1.000000E+00 | −2.110535E+00 |
| A4 | 5.123214E−02 | 1.239788E−01 | 2.480207E−01 | 2.495185E−01 | 1.098070E−02 | −2.000549E−01 |
| A6 | −4.116041E−02 | −6.080077E−01 | −7.207634E−01 | −4.512706E−01 | −2.150863E−01 | 1.094592E−01 |
| A8 | −3.695194E−01 | 1.190722E+00 | 1.133071E+00 | 4.019315E−01 | 2.017835E−01 | −4.361125E−02 |
| A10 | 2.458662E+00 | −1.487220E+00 | −1.227196E+00 | −2.228395E−01 | −9.010124E−02 | 1.283545E−02 |
| A12 | −7.079874E+00 | 1.214813E+00 | 8.913534E−01 | 7.959990E−02 | 2.388321E−02 | −2.690946E−03 |
| A14 | 1.115118E+01 | −6.435755E−01 | −4.238459E−01 | −1.818854E−02 | −3.988826E−03 | 3.823739E−04 |
| A16 | −9.921908E+00 | 2.112916E−01 | 1.241752E−01 | 2.557105E−03 | 4.146557E−04 | −3.453514E−05 |
| A18 | 4.710847E+00 | −3.867998E−02 | −2.006101E−02 | −2.008775E−04 | −2.458286E−05 | 1.774445E−06 |
| A20 | −9.346244E−01 | 2.992890E−03 | 1.358931E−03 | 6.734281E−06 | 6.352365E−07 | −3.927942E−08 |

The imaging lens in Example 4 satisfies conditional expressions (1) to (18) as shown in Table 12.

Figure 8:
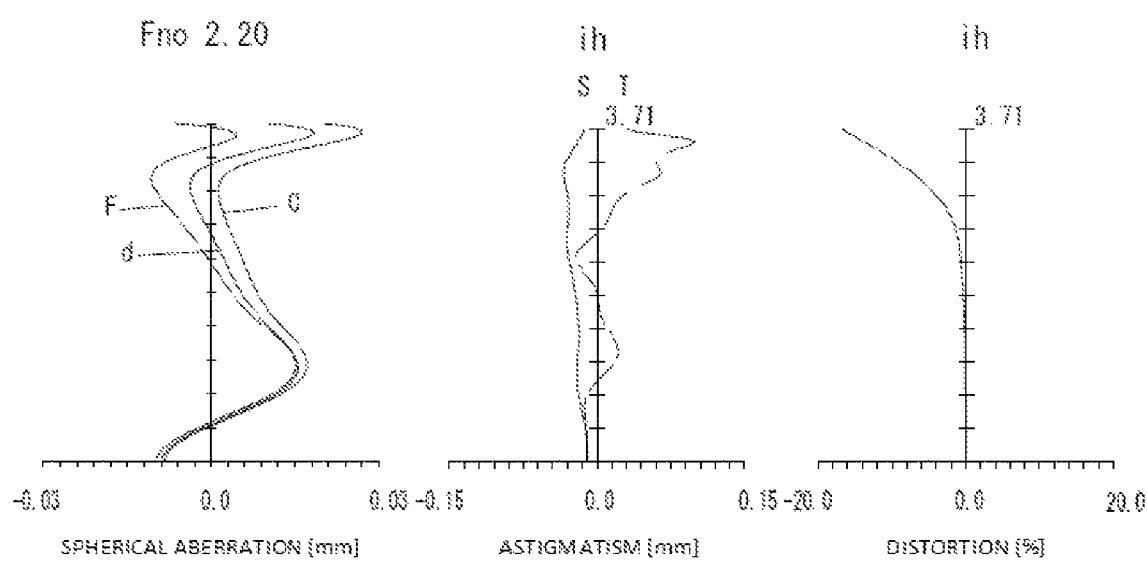
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 3.08
Fno = 2.20
ω(°) = 54.5
h = 3.71
TTL = 6.03

Surface Data

| i | r | d | Nd | νd | |
|---|---|---|---|---|---|
| (Object) | Infinity | Infinity | | | |
| 1* | 9.5605 | 0.3275 | 1.544 | 56.44 | (νd1) |
| 2* | 2.7060 | 0.4816 | | | |
| 3 (Stop) | Infinity | −0.0395 | | | |
| 4* | 4.5402 | 0.6090 | 1.544 | 56.44 | (νd2) |
| 5* | −1.8117 | 0.0250 | | | |
| 6* | 6.4191 | 0.3000 | 1.671 | 19.24 | (νd3) |
| 7* | 3.0881 | 0.3567 | | | |
| 8* | −6.0409 | 1.5400 | 1.535 | 55.69 | (νd4) |
| 9* | −1.1817 | 0.0200 | | | |
| 10* | Infinity | 0.4853 | 1.671 | 19.24 | (νd5) |
| 11* | Infinity | 0.2488 | | | |
| 12* | Infinity | 0.5950 | 1.639 | 23.52 | (νd6) |
| 13* | 1.4808 | 0.6000 | | | |
| 14 | Infinity | 0.2100 | 1.517 | 64.20 | |
| 15 | Infinity | 0.3398 | | | |
| Image Plane | Infinity | | | | |

Constituent Lens Data

| Lens | Start Surface | Focal Length |
|---|---|---|
| 1 | 1 | −7.051 |
| 2 | 4 | 2.462 |
| 3 | 6 | −9.205 |
| 4 | 8 | 2.474 |
| 5 | 10 | Infinity |
| 6 | 12 | −2.317 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 1.320447E+00 | 0.000000E+00 | 0.000000E+00 |
| A4 | 2.209561E−01 | 3.874819E−01 | 2.428049E−02 | 4.195938E−02 | −1.743464E−04 | −7.121319E−05 |
| A6 | −1.706732E−01 | −4.285290E−01 | 7.053779E−02 | −2.506408E−01 | −3.051021E−01 | −3.867633E−01 |
| A8 | 1.955018E−01 | 6.015485E+00 | 1.479418E+00 | 2.233236E+00 | 2.373240E+00 | |
| A8 | | | −3.704243E−01 | | | |
| A10 | −1.775228E−01 | −4.368224E+01 | −1.437721E−01 | −6.225900E+00 | −8.149713E+00 | −7.286114E+00 |
| A12 | 9.021894E−02 | 1.830564E+02 | 6.095231E+00 | 1.704565E+01 | 1.800497E+01 | 1.388148E+01 |
| A14 | −2.504634E−02 | −4.540239E+02 | −2.164064E+01 | −3.092575E+01 | −2.486551E+01 | −1.661621E+01 |
| A16 | 0.000000E+00 | 6.651796E+02 | 3.439207E+01 | 3.491366E+01 | 2.053522E+01 | 1.202589E+01 |
| A18 | 0.000000E+00 | −5.319237E+02 | −2.613861E+01 | −2.209247E+01 | −9.144944E+00 | −4.790458E+00 |
| A20 | 0.000000E+00 | 1.787623E+02 | 7.792458E+00 | 6.062657E+00 | 1.678877E+00 | 8.073419E−01 |

| | Eighth Surface | Ninth Surface | Tenth Surface | Eleventh Surface | Twelfth Surface | Thirteenth Surface |
|---|---|---|---|---|---|---|
| k | 1.153153E+01 | −2.049064E+00 | −1.000000E+00 | −1.000000E+00 | −1.000000E+00 | −2.242993E+00 |
| A4 | 1.518169E−02 | 1.705614E−03 | 7.056451E−02 | 1.258882E−01 | −2.109549E−02 | −1.905362E−01 |
| A6 | −4.519102E−02 | −1.796178E−01 | −2.965016E−01 | −2.719224E−01 | −1.746034E−01 | 1.056281E−01 |
| A8 | 2.525043E−01 | 3.937623E−01 | 5.485044E−01 | 2.760103E−01 | 1.818123E−01 | −4.242045E−02 |
| A10 | −6.962136E−01 | −5.014027E−01 | −6.692067E−01 | −1.688628E−01 | −8.603057E−02 | 1.211942E−02 |
| A12 | 9.056858E−01 | 3.693652E−01 | 5.173987E−01 | 6.451913E−02 | 2.405381E−02 | −2.398848E−03 |
| A14 | −4.614765E−01 | −1.523205E−01 | −2.543857E−01 | −1.541806E−02 | −4.250840E−03 | 3.193623E−04 |
| A16 | −8.154853E−02 | 2.888962E−02 | 7.537629E−02 | 2.232341E−03 | 4.693894E−04 | −2.717094E−05 |
| A18 | 1.780138E−01 | 4.773631E−05 | −1.204337E−02 | −1.786339E−04 | −2.961990E−05 | 1.329166E−06 |
| A20 | −5.327916E−02 | −5.624092E−04 | 7.882988E−04 | 6.050603E−06 | 8.144665E−07 | −2.834407E−08 |

The imaging lens in Example 5 satisfies conditional expressions (1) to (18) as shown in Table 12.

Figure 10:
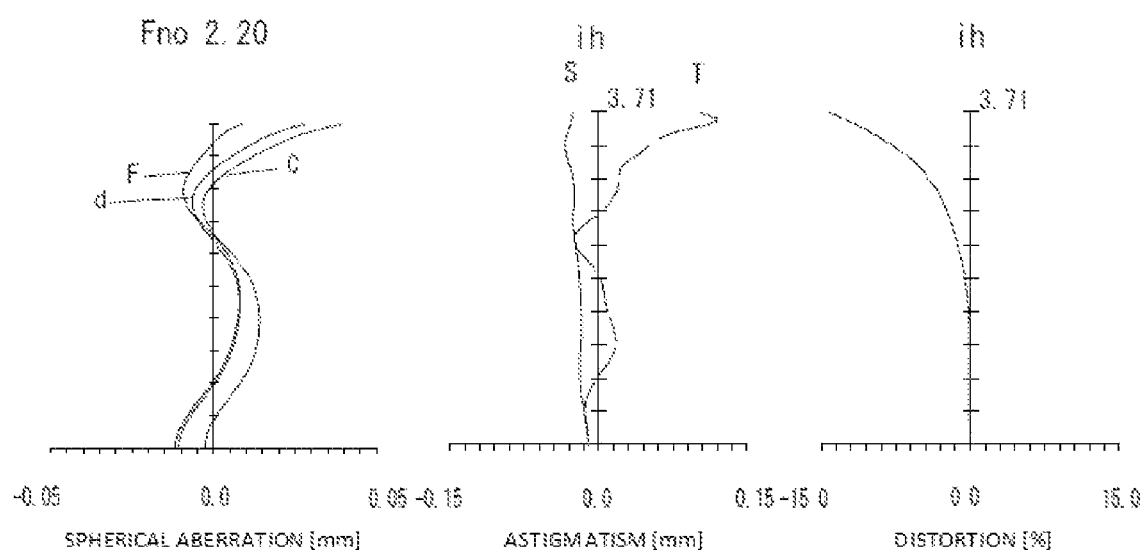
FIG. 10 shows spherical aberration, astigmatism, and distortion of the imaging lens in Example 5 according to the present invention.
Figure 11:
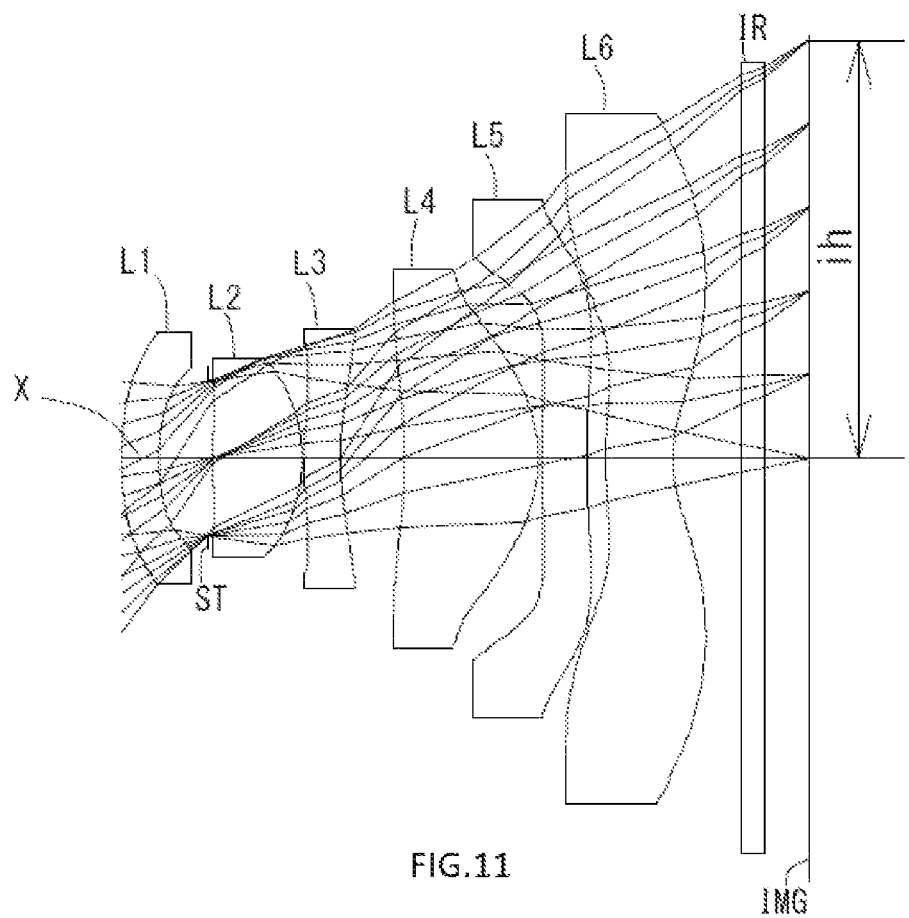
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6
Unit mm
f = 3.08
Fno = 2.20
ω(°) = 54.5
h = 3.71
TTL = 6.03

Surface Data

| i | r | d | Nd | vd | |
|---|---|---|---|---|---|
| (Object) | Infinity | Infinity | | | |
| 1* | 3.9230 | 0.3275 | 1.544 | 55.93 | (vd1) |
| 2* | 2.1568 | 0.4433 | | | |
| 3 (Stop) | Infinity | 0.0359 | | | |
| 4* | 16.6400 | 0.7897 | 1.535 | 55.69 | (vd2) |
| 5* | −1.3834 | 0.0250 | | | |
| 6* | 5.5562 | 0.3157 | 1.671 | 19.24 | (vd3) |
| 7* | 2.5544 | 0.5677 | | | |
| 8* | −5.0081 | 1.1892 | 1.544 | 55.93 | (vd4) |
| 9* | −1.3069 | 0.0361 | | | |
| 10* | Infinity | 0.4000 | 1.671 | 19.24 | (vd5) |
| 11* | Infinity | 0.1591 | | | |
| 12* | 3.3120 | 0.5950 | 1.614 | 25.59 | (vd6) |
| 13* | 1.0641 | 0.6000 | | | |
| 14 | Infinity | 0.2100 | 1.517 | 64.20 | |
| 15 | Infinity | 0.4056 | | | |
| Image Plane | Infinity | | | | |

Constituent Lens Data

| Lens | Start Surface | Focal Length |
|---|---|---|
| 1 | 1 | −9.417 |
| 2 | 4 | 2.425 |
| 3 | 6 | −7.360 |
| 4 | 8 | 2.918 |
| 5 | 10 | Infinity |
| 6 | 12 | −2.839 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 9.156547E−01 | 0.000000E+00 | 0.000000E+00 |
| A4 | 1.481335E−01 | 2.326361E−01 | −1.631833E−02 | 1.211178E−01 | −1.036758E−01 | −1.835762E−01 |
| A6 | −7.241478E−02 | 6.221543E−01 | 4.172064E−02 | −3.332400E−01 | 2.645300E−01 | 3.849702E−01 |
| A8 | 1.407488E−01 | −5.292667E+00 | −4.851245E−01 | 1.542467E+00 | −1.262377E+00 | −1.062796E+00 |
| A10 | −2.392969E−01 | 2.930250E+01 | 4.728804E−01 | −6.258822E+00 | 3.969133E+00 | 2.301117E+00 |
| A12 | 2.567578E−01 | −1.002461E+02 | 3.766803E+00 | 1.750401E+01 | −8.007049E+00 | −3.424962E+00 |
| A14 | −1.534367E−01 | 2.166304E+02 | −1.892487E+01 | −3.159589E+01 | 1.007646E+01 | 3.296866E+00 |
| A16 | 3.389416E−02 | −2.851396E+02 | 3.742673E+01 | 3.482864E+01 | −7.693730E+00 | −1.958574E+00 |
| A18 | 0.000000E+00 | 2.086787E+02 | −3.719651E+01 | −2.123677E+01 | 3.264791E+00 | 6.518552E−01 |
| A20 | 0.000000E+00 | −6.563896E+01 | 1.479133E+01 | 5.492549E+00 | −5.889189E−01 | −9.282695E−02 |

| | Eighth Surface | Ninth Surface | Tenth Surface | Eleventh Surface | Twelfth Surface | Thirteenth Surface |
|---|---|---|---|---|---|---|
| k | 1.140197E+01 | −3.249238E+00 | 0.000000E+00 | 0.000000E+00 | −3.096007E+01 | −4.636422E+00 |
| A4 | 1.311887E−02 | −1.279772E−01 | 3.884332E−02 | 1.768887E−01 | −5.316492E−02 | −1.132005E−01 |
| A6 | 1.176134E−01 | 2.173463E−01 | 8.130358E−02 | −2.380775E−01 | −1.199028E−01 | 4.789622E−02 |
| A8 | −2.970809E−01 | −2.781895E−01 | −3.207436E−01 | 1.325203E−01 | 1.231478E−01 | −1.193621E−02 |
| A10 | 4.827510E−01 | 1.680328E−01 | 3.998165E−01 | −3.439833E−02 | −5.478334E−02 | 1.261587E−03 |
| A12 | −5.029935E−01 | −2.024072E−04 | −3.008751E−01 | −2.621375E−04 | 1.418181E−02 | 1.410890E−04 |
| A14 | 3.434360E−01 | −6.125502E−02 | 1.484473E−01 | 2.638525E−03 | −2.277111E−03 | −6.328158E−05 |

TABLE 6-continued

| | Example 6 Unit mm f = 3.08 Fno = 2.20 ω(°) = 54.5 h = 3.71 TTL = 6.03 | | | | | |
|---|---|---|---|---|---|---|
| A16 | −1.469118E−01 | 3.626078E−02 | −4.741905E−02 | −7.001171E−04 | 2.243364E−04 | 8.388443E−06 |
| A18 | 3.539673E−02 | −8.868151E−03 | 8.789073E−03 | 7.931953E−05 | −1.247082E−05 | −5.171248E−07 |
| A20 | −3.639312E−03 | 8.070907E−04 | −7.022709E−04 | −3.467365E−06 | 3.004226E−07 | 1.250321E−08 |

The imaging lens in Example 6 satisfies conditional expressions (1) to (18) as shown in Table 12.

Figure 12:
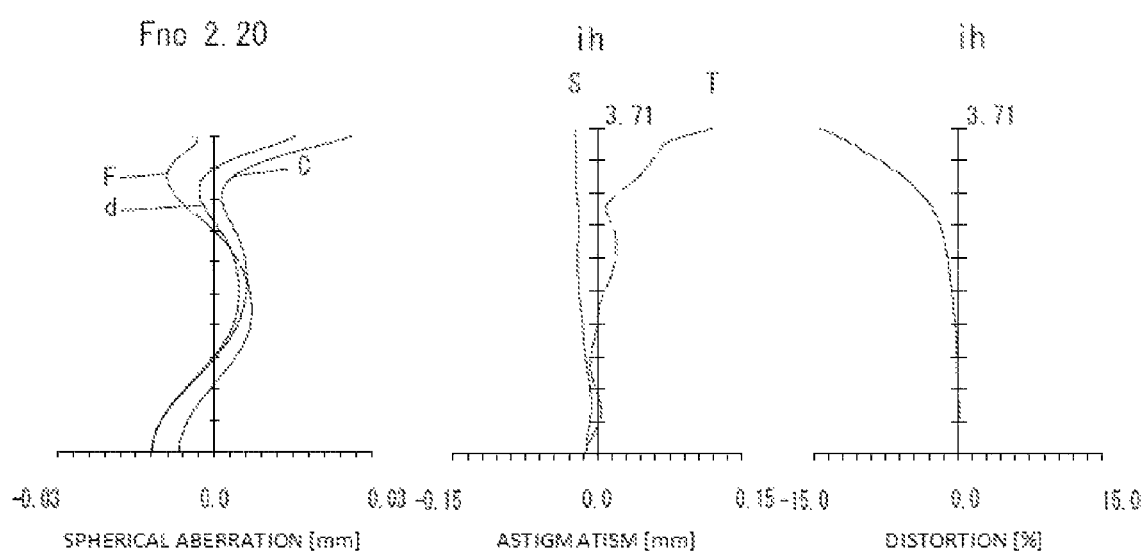
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

| Example 7 Unit mm f = 3.08 Fno = 2.20 ω(°) = 54.5 h = 3.71 TTL = 6.03 |
|---|

| Surface Data | | | | | |
|---|---|---|---|---|---|
| i | r | d | Nd | vd | |
| (Object) | Infinity | Infinity | | | |
| 1* | 4.3907 | 0.3275 | 1.544 | 55.93 | (vd1) |
| 2* | 2.1710 | 0.4263 | | | |
| 3 (Stop) | Infinity | 0.0451 | | | |
| 4* | 20.0574 | 0.6538 | 1.544 | 55.93 | (vd2) |
| 5* | −1.6757 | 0.0302 | | | |
| 6* | 3.5011 | 0.3000 | 1.671 | 19.24 | (vd3) |
| 7* | 1.9762 | 0.2669 | | | |
| 8* | 20.0378 | 1.5213 | 1.535 | 55.69 | (vd4) |
| 9* | −1.5601 | 0.2197 | | | |
| 10* | Infinity | 0.4098 | 1.671 | 19.24 | (vd5) |
| 11* | Infinity | 0.1508 | | | |
| 12* | 3.9826 | 0.5800 | 1.614 | 25.59 | (vd6) |
| 13* | 1.1894 | 0.6000 | | | |
| 14 | Infinity | 0.2100 | 1.517 | 64.20 | |
| 15 | Infinity | 0.3581 | | | |
| Image Plane | Infinity | | | | |

| Constituent Lens Data | | |
|---|---|---|
| Lens | Start Surface | Focal Length |
| 1 | 1 | −8.323 |
| 2 | 4 | 2.872 |
| 3 | 6 | −7.345 |
| 4 | 8 | 2.774 |
| 5 | 10 | Infinity |
| 6 | 12 | −2.998 |

| Aspheric Surface Data | | | | | |
|---|---|---|---|---|---|
| | First Surface | Second Surface | Fourth Surface | Fifth Surface | Sixth Surface | Seventh Surface |
| k | 0.000000E+00 | 0.000000E+00 | 0.000000E+00 | 1.267632E+00 | 0.000000E+00 | 0.000000E+00 |
| A4 | 2.139030E−01 | 3.395059E−01 | 2.684822E−02 | 7.401817E−02 | −1.829230E−01 | −2.195474E−01 |
| A6 | −3.079895E−01 | −7.970117E−02 | −4.257243E−02 | −2.026275E−01 | 5.131342E−01 | 2.642968E−01 |
| A8 | 1.278742E+00 | 2.917661E+00 | −1.022467E−01 | 1.250633E+00 | −2.191481E+00 | −5.144172E−01 |
| A10 | −3.889680E+00 | −2.721355E+01 | 2.411828E−01 | −6.096812E+00 | 7.205521E+00 | 1.193623E+00 |

TABLE 7-continued

Example 7
Unit mm
f = 3.08
Fno = 2.20
ω(°) = 54.5
h = 3.71
TTL = 6.03

| | | | | | | |
|---|---|---|---|---|---|---|
| A12 | 7.713419E+00 | 1.364405E+02 | 1.126554E+00 | 1.737294E+01 | −1.581965E+01 | −2.188386E+00 |
| A14 | −9.740196E+00 | −3.921863E+02 | −1.259215E+01 | −3.156932E+01 | 2.168884E+01 | 2.504040E+00 |
| A16 | 7.543835E+00 | 6.575863E+02 | 3.744105E+01 | 3.495320E+01 | −1.793471E+01 | −1.690061E+00 |
| A18 | −3.276096E+00 | −5.973441E+02 | −5.119157E+01 | −2.129872E+01 | 8.185701E+00 | 6.159588E−01 |
| A20 | 6.084028E−01 | 2.251713E+02 | 2.706209E+01 | 5.387432E+00 | −1.576352E+00 | −9.282166E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.190637E+00 | 0.000000E+00 | 0.000000E+00 | −2.196350E+01 | −4.776088E+00 |
| A4 | 5.684567E−02 | −5.383961E−02 | 1.328738E−01 | 2.405141E−01 | −1.005849E−01 | −1.421309E−01 |
| A6 | −2.492397E−03 | 4.198172E−02 | −2.047555E−01 | −3.879665E−01 | −1.201512E−01 | 6.732585E−02 |
| A8 | −1.008036E−01 | −1.061770E−01 | 3.416908E−02 | 2.565473E−01 | 1.575916E−01 | −1.622959E−02 |
| A10 | 2.123322E−01 | 1.646341E−01 | 1.079897E−01 | −9.479158E−02 | −7.847617E−02 | 1.006612E−03 |
| A12 | −1.906889E−01 | −1.306256E−01 | −1.473557E−01 | 1.977862E−02 | 2.195509E−02 | 4.243740E−04 |
| A14 | 5.541955E−02 | 5.577930E−02 | 1.046204E−01 | −1.960759E−03 | −3.738695E−03 | −1.175789E−04 |
| A16 | 2.967504E−02 | −1.117136E−02 | −4.581053E−02 | −3.991287E−06 | 3.856542E−04 | 1.329198E−05 |
| A18 | −2.572142E−02 | 4.548390E−04 | 1.123133E−02 | 1.710344E−05 | −2.222310E−05 | −7.320897E−07 |
| A20 | 5.218491E−03 | 9.280060E−05 | −1.142842E−03 | −9.956979E−07 | 5.503915E−07 | 1.610650E−08 |

The imaging lens in Example 7 satisfies conditional expressions (1) to (18) as shown in Table 12.

Figure 14:
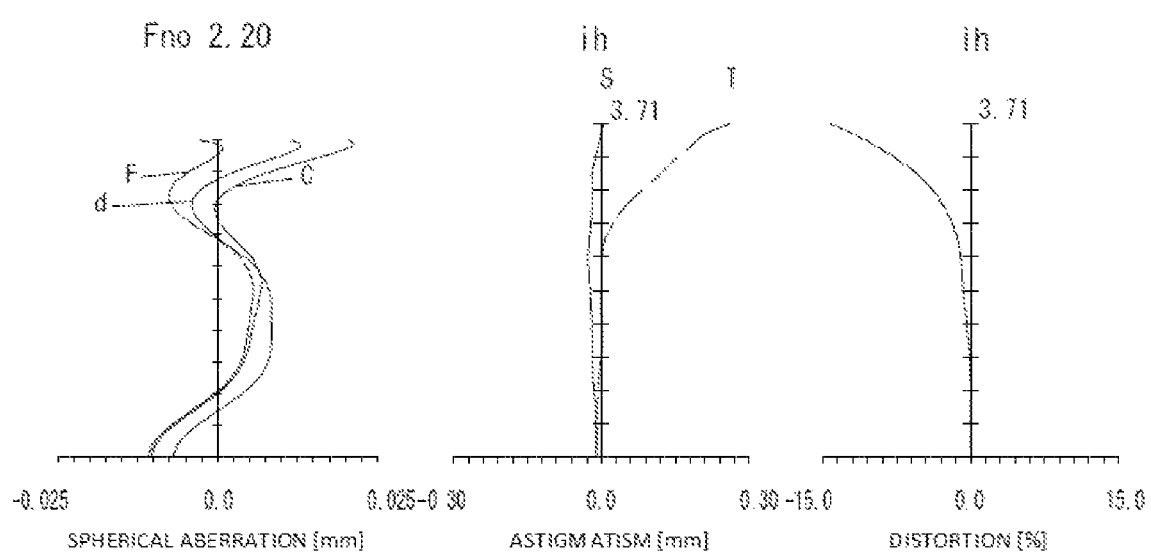
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

Example 8
Unit mm
f = 3.08
Fno = 2.20
ω(°) = 54.5
h = 3.71
TTL = 6.03

Surface Data

| i | r | d | Nd | vd | |
|---|---|---|---|---|---|
| (Object) | Infinity | Infinity | | | |
| 1* | 4.5055 | 0.3275 | 1.544 | 55.93 | (vd1) |
| 2* | 2.3142 | 0.4175 | | | |
| 3 (Stop) | Infinity | 0.0451 | | | |
| 4* | −1625.4480 | 0.6417 | 1.544 | 55.93 | (vd2) |
| 5* | −1.6118 | 0.0471 | | | |
| 6* | 3.5474 | 0.3000 | 1.671 | 19.24 | (vd3) |
| 7* | 2.0059 | 0.2647 | | | |
| 8* | 20.0378 | 1.5370 | 1.535 | 55.69 | (vd4) |
| 9* | −1.5588 | 0.2177 | | | |
| 10* | Infinity | 0.4104 | 1.671 | 19.24 | (vd5) |
| 11* | Infinity | 0.1428 | | | |
| 12* | 3.7875 | 0.5800 | 1.614 | 25.59 | (vd6) |
| 13* | 1.1693 | 0.6000 | | | |
| 14 | Infinity | 0.2100 | 1.517 | 64.20 | |
| 15 | Infinity | 0.3584 | | | |
| Image Plane | Infinity | | | | |

TABLE 8-continued

Example 8
Unit mm
f = 3.08
Fno = 2.20
ω(°) = 54.5
h = 3.71
TTL = 6.03

Constituent Lens Data

| Lens | Start Surface | Focal Length |
|---|---|---|
| 1 | 1 | −9.228 |
| 2 | 4 | 2.964 |
| 3 | 6 | −7.465 |
| 4 | 8 | 2.773 |
| 5 | 10 | Infinity |
| 6 | 12 | −3.007 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 1.232934E+00 | 0.000000E+00 | 0.000000E+00 |
| A4 | 2.047733E−01 | 3.238716E−01 | 1.805472E−02 | 7.222558E−02 | −1.655516E−01 | −2.092608E−01 |
| A6 | −2.116709E−01 | 2.453314E−01 | −5.845174E−02 | −2.037745E−01 | 3.568758E−01 | 2.083411E−01 |
| A8 | 7.207254E−01 | −1.351057E+00 | −9.495710E−02 | 1.256524E+00 | −1.437260E+00 | −3.096317E−01 |
| A10 | −1.959461E+00 | 2.999893E+00 | 2.525073E−01 | −6.088693E+00 | 4.696106E+00 | 5.722463E−01 |
| A12 | 3.677182E+00 | 9.824888E+00 | 1.112987E+00 | 1.737433E+01 | −1.037823E+01 | −9.702865E−01 |
| A14 | −4.553907E+00 | −6.835992E+01 | −1.272507E+01 | −3.157774E+01 | 1.429100E+01 | 1.052234E+00 |
| A16 | 3.546760E+00 | 1.599587E+02 | 3.723863E+01 | 3.494834E+01 | −1.183389E+01 | −6.663575E−01 |
| A18 | −1.579975E+00 | −1.741230E+02 | −5.105478E+01 | −2.129842E+01 | 5.394578E+00 | 2.227860E−01 |
| A20 | 3.029676E−01 | 7.189177E+01 | 2.741126E+01 | 5.374564E+00 | −1.034339E+00 | −2.954240E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.157407E+00 | 0.000000E+00 | 0.000000E+00 | −2.136723E+01 | −4.676720E+00 |
| A4 | 4.660361E−02 | −5.618232E−02 | 1.328605E−01 | 2.389705E−01 | −1.017790E−01 | −1.434320E−01 |
| A6 | 7.187160E−02 | 5.495606E−02 | −1.929751E−01 | −3.813978E−01 | −1.184331E−01 | 6.883802E−02 |
| A8 | −3.466656E−01 | −1.392649E−01 | 1.838768E−03 | 2.466878E−01 | 1.565516E−01 | −1.692185E−02 |
| A10 | 7.165061E−01 | 2.122321E−01 | 1.580826E−01 | −8.722069E−02 | −7.812172E−02 | 1.159647E−03 |
| A12 | −8.588086E−01 | −1.723890E−01 | −1.945214E−01 | 1.643002E−02 | 2.187743E−02 | 4.161284E−04 |
| A14 | 6.254830E−01 | 7.920054E−02 | 1.317885E−01 | −1.070797E−03 | −3.726790E−03 | −1.209302E−04 |
| A16 | −2.725170E−01 | −1.945869E−02 | −5.488294E−02 | −1.446807E−04 | 3.843511E−04 | 1.405625E−05 |
| A18 | 6.485538E−02 | 2.133437E−03 | 1.279521E−02 | 2.932320E−05 | −2.213180E−05 | −7.963498E−07 |
| A20 | −6.486042E−03 | −5.260105E−05 | −1.246567E−03 | −1.445238E−06 | 5.474442E−07 | 1.809117E−08 |

The imaging lens in Example 8 satisfies conditional expressions (1) to (18) as shown in Table 12.

Figure 16:
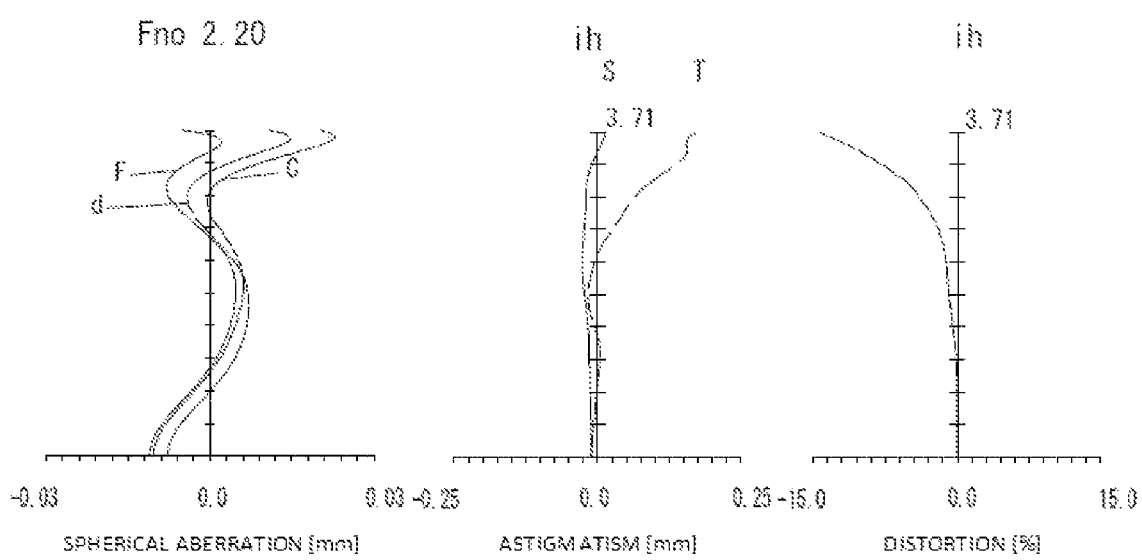
FIG. 16 shows spherical aberration, astigmatism, and distortion of the imaging lens in Example 8 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

Example 9
Unit mm
f = 3.08
Fno = 2.20
ω(°) = 54.5
h = 3.71
TTL = 6.03

Surface Data

| i | r | d | Nd | vd | |
|---|---|---|---|---|---|
| (Object) | Infinity | Infinity | | | |
| 1* | 6.3360 | 0.3275 | 1.544 | 55.93 | (vd1) |

TABLE 9-continued

Example 9
Unit mm
f = 3.08
Fno = 2.20
ω(°) = 54.5
h = 3.71
TTL = 6.03

| | | | | | |
|---|---|---|---|---|---|
| 2* | 2.5843 | 0.4227 | | | |
| 3 (Stop) | Infinity | 0.0121 | | | |
| 4* | 21.7787 | 0.7939 | 1.544 | 55.93 | (vd2) |
| 5* | −1.6468 | 0.0250 | | | |
| 6* | 3.9127 | 0.3482 | 1.671 | 19.24 | (vd3) |
| 7* | 2.0789 | 0.2602 | | | |
| 8* | 40.7097 | 1.2728 | 1.535 | 55.69 | (vd4) |
| 9* | −1.7494 | 0.3701 | | | |
| 10* | Infinity | 0.4000 | 1.671 | 19.24 | (vd5) |
| 11* | Infinity | 0.1465 | | | |
| 12* | 2.6098 | 0.5500 | 1.614 | 25.59 | (vd6) |
| 13* | 1.0997 | 0.6000 | | | |
| 14 | Infinity | 0.2100 | 1.517 | 64.20 | |
| 15 | Infinity | 0.3610 | | | |
| Image Plane | Infinity | | | | |

Constituent Lens Data

| Lens | Start Surface | Focal Length |
|---|---|---|
| 1 | 1 | −8.273 |
| 2 | 4 | 2.847 |
| 3 | 6 | −7.158 |
| 4 | 8 | 3.169 |
| 5 | 10 | Infinity |
| 6 | 12 | −3.592 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 8.985787E−01 | 0.000000E+00 | 0.000000E+00 |
| A4 | 2.263271E−01 | 4.448919E−01 | 1.136454E−01 | 9.727224E−02 | −1.178326E−01 | −1.780342E−01 |
| A6 | −2.767123E−01 | −1.320721E+00 | −1.394171E+00 | −3.382755E−01 | 2.442416E−01 | 2.284520E−01 |
| A8 | 9.084906E−01 | 1.335635E+01 | 1.650331E+01 | 2.467157E+00 | −1.134331E+00 | −5.881744E−01 |
| A10 | −2.351895E+00 | −7.984419E+01 | −1.152783E+02 | −1.236271E+01 | 3.613849E+00 | 1.340995E+00 |
| A12 | 4.162629E+00 | 3.041126E+02 | 4.994143E+02 | 3.765240E+01 | −7.662871E+00 | −2.199002E+00 |
| A14 | −4.810531E+00 | −7.272932E+02 | −1.355261E+03 | −7.048870E+01 | 1.049749E+01 | 2.364247E+00 |
| A16 | 3.459373E+00 | 1.062919E+03 | 2.244113E+03 | 7.898768E+01 | −9.030823E+00 | −1.595205E+00 |
| A18 | −1.406923E+00 | −8.647498E+02 | −2.073013E+03 | −4.841743E+01 | 4.460627E+00 | 6.126796E−01 |
| A20 | 2.453365E−01 | 2.999766E+02 | 8.192444E+02 | 1.252079E+01 | −9.602614E−01 | −1.017990E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −5.346743E+00 | 0.000000E+00 | 0.000000E+00 | −1.901991E+01 | 4.655415E+00 |
| A4 | 6.303981E−02 | −7.991110E−02 | 1.218544E−01 | 2.196877E−01 | −1.060698E−01 | −1.447777E−01 |
| A6 | 6.796465E−03 | 3.184989E−02 | −2.562160E−01 | −4.520592E−01 | −1.410682E−01 | 7.462577E−02 |
| A8 | −9.387206E−02 | 4.229424E−02 | 1.737253E−01 | 4.257505E−01 | 1.797850E−01 | −2.497768E−02 |
| A10 | 2.177692E−01 | −1.216937E−01 | 2.080949E−02 | −2.406452E−01 | −8.910943E−02 | 5.083331E−03 |
| A12 | −3.002958E−01 | 1.709494E−01 | −1.730763E−01 | 8.453835E−02 | 2.503559E−02 | −5.371094E−04 |
| A14 | 2.765088E−01 | −1.425242E−01 | 1.708664E−01 | −1.852466E−02 | −4.310546E−03 | 7.027931E−06 |
| A16 | −1.658351E−01 | 7.053075E−02 | −8.615266E−02 | 2.465545E−03 | 4.519702E−04 | 4.597494E−06 |
| A18 | 5.726790E−02 | −1.859187E−02 | 2.246591E−02 | −1.825586E−04 | −2.658053E−05 | −4.493669E−07 |
| A20 | −8.556668E−03 | 1.975500E−03 | −2.349532E−03 | 5.767432E−06 | 6.737817E−07 | 1.359223E−08 |

The imaging lens in Example 9 satisfies conditional expressions (1) to (18) as shown in Table 12.

Figure 18:
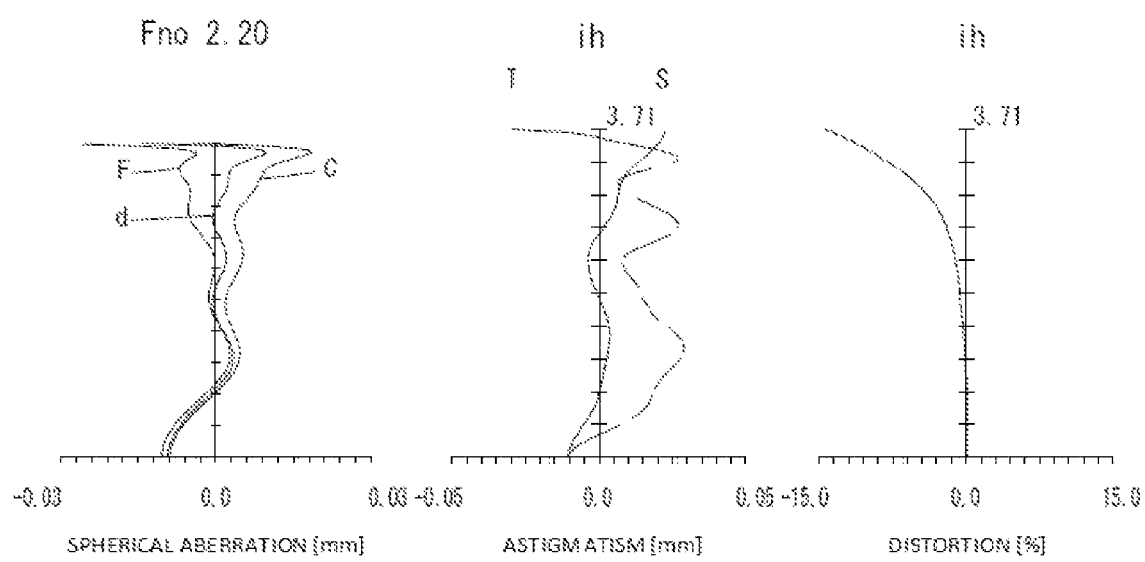
FIG. 18 shows spherical aberration, astigmatism, and distortion of the imaging lens in Example 9 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example 10
Unit mm
f = 2.71
Fno = 2.20
ω(°) = 56.2
h = 3.71
TTL = 5.60

Surface Data

| i | r | d | Nd | vd | |
|---|---|---|---|---|---|
| (Object) | Infinity | Infinity | | | |
| 1* | 8.6422 | 0.3742 | 1.535 | 55.69 | (vd1) |
| 2* | 2.3547 | 0.3991 | | | |
| 3 (Stop) | Infinity | 0.0100 | | | |
| 4* | 6.7524 | 0.6815 | 1.544 | 55.93 | (vd2) |
| 5* | −1.9060 | 0.0217 | | | |
| 6* | −500.0000 | 0.2000 | 1.671 | 19.24 | (vd3) |
| 7* | 4.6984 | 0.1184 | | | |
| 8* | −10.3482 | 0.7679 | 1.535 | 55.69 | (vd4) |
| 9* | −1.5848 | 0.5045 | | | |
| 10* | Infinity | 0.6953 | 1.535 | 55.69 | (vd5) |
| 11* | Infinity | 0.1782 | | | |
| 12* | 1.7971 | 0.6644 | 1.614 | 25.59 | (vd6) |
| 13* | 1.0555 | 0.5500 | | | |
| 14 | Infinity | 0.2100 | 1.517 | 64.20 | |
| 15 | Infinity | 0.3008 | | | |
| Image Plane | Infinity | | | | |

Constituent Lens Data

| Lens | Start Surface | Focal Length |
|---|---|---|
| 1 | 1 | −6.180 |
| 2 | 4 | 2.809 |
| 3 | 6 | −6.938 |
| 4 | 8 | 3.396 |
| 5 | 10 | Infinity |
| 6 | 12 | −6.318 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 3.257950E+00 | 0.000000E+00 | 0.000000E+00 |
| A4 | 2.509834E−01 | 5.045987E−01 | 7.231745E−02 | −1.503137E−02 | −1.961195E−01 | −1.491307E−01 |
| A6 | −2.786727E−01 | −1.104773E+00 | −1.467664E+00 | −3.905839E−01 | 1.693132E−01 | 2.209796E−01 |
| A8 | 8.961541E−01 | 1.244789E+01 | 1.644351E+01 | 2.382622E+00 | −1.159287E+00 | −6.277157E−01 |
| A10 | −2.321756E+00 | −7.793297E+01 | −1.155116E+02 | −1.226845E+01 | 3.666129E+00 | 1.387827E+00 |
| A12 | 4.158331E+00 | 3.040985E+02 | 4.994146E+02 | 3.764756E+01 | −7.740929E+00 | −2.199300E+00 |
| A14 | −4.801424E+00 | −7.272931E+02 | −1.355261E+03 | −7.048880E+01 | 1.058094E+01 | 2.357787E+00 |
| A16 | 3.458351E+00 | 1.062919E+03 | 2.244113E+03 | 7.898768E+01 | −9.030675E+00 | −1.605569E+00 |
| A18 | −1.407159E+00 | −8.647498E+02 | −2.073013E+03 | −4.841743E+01 | 4.460636E+00 | 6.126507E−01 |
| A20 | 2.453139E−01 | 2.999766E+02 | 8.192444E+02 | 1.252079E+01 | −9.602600E−01 | −1.018010E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.767275E+00 | 0.000000E+00 | 0.000000E+00 | 0.000000E+00 | −2.542248E+00 |
| A4 | 4.888412E−02 | −1.193719E−01 | 8.723967E−02 | 1.313210E−01 | −1.888548E−01 | −1.585787E−01 |
| A6 | 4.691617E−03 | 1.429285E−02 | −2.629688E−01 | −4.401547E−01 | −1.579355E−01 | 7.628326E−02 |
| A8 | −6.143961E−02 | 4.777043E−02 | 1.818238E−01 | 4.261467E−01 | 1.617216E−01 | −2.508817E−02 |
| A10 | 2.155837E−01 | −1.103624E−01 | 9.752575E−03 | −2.472234E−01 | −8.411183E−02 | 5.047677E−03 |
| A12 | −3.075183E−01 | 1.722451E−01 | −1.702128E−01 | 8.565372E−02 | 2.434023E−02 | −5.281190E−04 |
| A14 | 2.765436E−01 | −1.423056E−01 | 1.716893E−01 | −1.808581E−02 | −3.810019E−03 | 6.847121E−06 |

TABLE 10-continued

Example 10
Unit mm
f = 2.71
Fno = 2.20
ω(°) = 56.2
h = 3.71
TTL = 5.60

| | | | | | | |
|---|---|---|---|---|---|---|
| A16 | −1.547868E−01 | 7.058545E−02 | −8.698844E−02 | 2.418369E−03 | 5.227712E−04 | 4.565150E−06 |
| A18 | 3.912541E−02 | −1.764496E−02 | 2.222286E−02 | −1.886686E−04 | −8.456335E−05 | 4.582229E−07 |
| A20 | 0.000000E+00 | 2.097791E−03 | −2.324314E−03 | 0.000000E+00 | 0.000000E+00 | 1.441375E−08 |

The imaging lens in Example 10 satisfies conditional expressions (1) to (18) as shown in Table 12.

Figure 20:
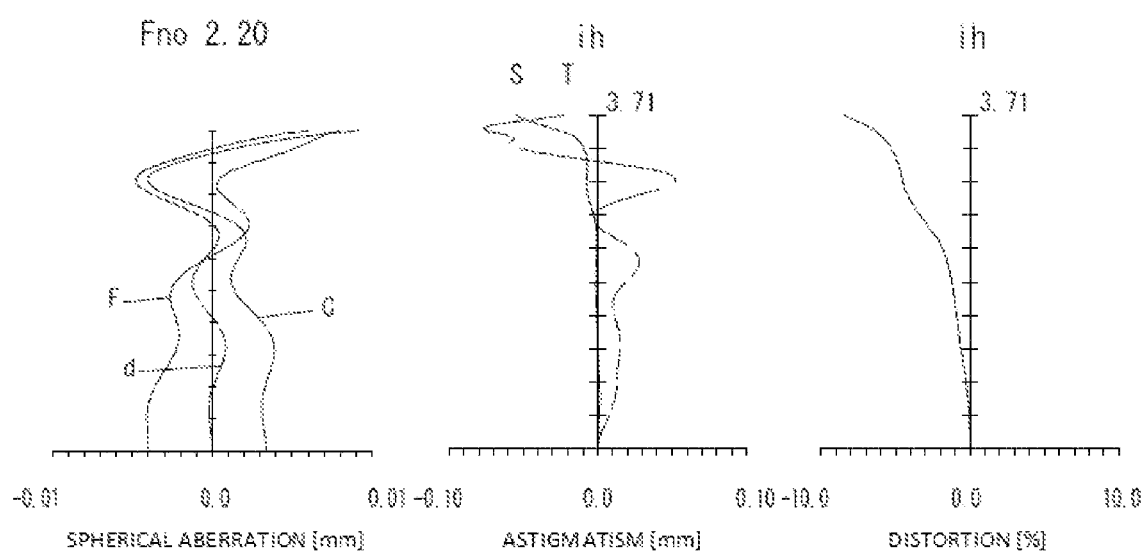
FIG. 20 shows spherical aberration, astigmatism, and distortion of the imaging lens in Example 10 according to the present invention.

FIG. 20 shows spherical aberration (mm), astigmatism (mm), and distortion (%) of the imaging lens in Example 10. As shown in FIG. 20, each aberration is corrected excellently.

Example 11

The basic lens data is shown below in Table 11.

TABLE 11

Example 11
Unit mm
f = 2.76
Fno = 2.20
ω(°) = 55.7
h = 3.71
TTL = 5.61

Surface Data

| i | r | d | Nd | vd | |
|---|---|---|---|---|---|
| (Object) | Infinity | Infinity | | | |
| 1* | 5.0982 | 0.3821 | 1.535 | 55.69 | (vd1) |
| 2* | 1.8529 | 0.4423 | | | |
| 3 (Stop) | Infinity | 0.0100 | | | |
| 4* | 5.3592 | 0.7209 | 1.544 | 55.93 | (vd2) |
| 5* | −1.8741 | 0.0440 | | | |
| 6* | 400.0000 | 0.2000 | 1.671 | 19.24 | (vd3) |
| 7* | 3.8952 | 0.1113 | | | |
| 8* | −17.8032 | 0.7889 | 1.535 | 55.69 | (vd4) |
| 9* | −1.6137 | 0.5327 | | | |
| 10* | Infinity | 0.3703 | 1.535 | 55.69 | (vd5) |
| 11* | Infinity | 0.1520 | | | |
| 12* | 1.7958 | 0.6474 | 1.535 | 55.69 | (vd6) |
| 13* | 1.1001 | 0.5500 | | | |
| 14 | Infinity | 0.2100 | 1.517 | 64.20 | |
| 15 | Infinity | 0.5158 | | | |
| Image Plane | Infinity | | | | |

Constituent Lens Data

| Lens | Start Surface | Focal Length |
|---|---|---|
| 1 | 1 | −5.675 |
| 2 | 4 | 2.644 |
| 3 | 6 | −5.750 |
| 4 | 8 | 3.263 |
| 5 | 10 | Infinity |
| 6 | 12 | −7.858 |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 3.094917E+00 | 0.000000E+00 | 0.000000E+00 |
| A4 | 2.361808E−01 | 4.940023E−01 | 6.500759E−02 | −2.164381E−02 | −1.998467E−01 | −1.521684E−01 |
| A6 | −2.726535E−01 | −1.082188E+00 | −1.464787E+00 | −3.952532E−01 | 1.627495E−01 | 2.180769E−01 |
| A8 | 9.016111E−01 | 1.244037E+01 | 1.647071E+01 | 2.400197E+00 | −1.174365E+00 | −6.312939E−01 |

TABLE 11-continued

Example 11
Unit mm
f = 2.76
Fno = 2.20
ω(°) = 55.7
h = 3.71
TTL = 5.61

| | | | | | | |
|---|---|---|---|---|---|---|
| A10 | −2.326265E+00 | −7.780677E+01 | −1.156263E+02 | −1.228609E+01 | 3.668935E+00 | 1.389003E+00 |
| A12 | 4.158331E+00 | 3.040985E+02 | 4.994146E+02 | 3.764756E+01 | −7.740929E+00 | −2.199300E+00 |
| A14 | −4.801424E+00 | −7.272931E+02 | −1.355261E+03 | −7.048880E+01 | 1.058094E+01 | 2.357787E+00 |
| A16 | 3.458351E+00 | 1.062919E+03 | 2.244113E+03 | 7.898768E+01 | −9.030675E+00 | −1.605569E+00 |
| A18 | −1.407159E+00 | −8.647498E+02 | −2.073013E+03 | −4.841743E+01 | 4.460636E+00 | 6.126507E−01 |
| A20 | 2.453139E−01 | 2.999766E+02 | 8.192444E+02 | 1.252079E+01 | −9.602600E−01 | −1.018010E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −4.055519E+00 | 0.000000E+00 | 0.000000E+00 | 0.000000E+00 | −2.032380E+00 |
| A4 | 4.621200E−02 | −1.212919E−01 | 4.448397E−02 | 1.232337E−01 | −1.731471E−01 | −1.707827E−01 |
| A6 | −2.226054E−04 | 1.568926E−02 | −2.742867E−01 | −4.408271E−01 | −1.439280E−01 | 7.951514E−02 |
| A8 | −6.073701E−02 | 4.924524E−02 | 1.891211E−01 | 4.280397E−01 | 1.605532E−01 | −2.560541E−02 |
| A10 | 2.188052E−01 | −1.091270E−01 | 9.090069E−03 | −2.470409E−01 | −8.472610E−02 | 5.065216E−03 |
| A12 | −3.082898E−01 | 1.722380E−01 | −1.701494E−01 | 8.569488E−02 | 2.418460E−02 | −5.268945E−04 |
| A14 | 2.753918E−01 | −1.423685E−01 | 1.711143E−01 | −1.808036E−02 | −3.821598E−03 | 7.101163E−06 |
| A16 | −1.547867E−01 | 7.039602E−02 | −8.698800E−02 | 2.417715E−03 | 5.230131E−04 | 4.548558E−06 |
| A18 | 3.912548E−02 | −1.764497E−02 | 2.222307E−02 | 4.891354E−04 | −8.137837E−05 | −4.610907E−07 |
| A20 | 0.000000E+00 | 2.097785E−03 | −2.324190E−03 | 0.000000E+00 | 0.000000E+00 | 1.415830E−08 |

The imaging lens in Example 11 satisfies conditional expressions (1) to (6), and (8) to (18) as shown in Table 12.

Figure 22:
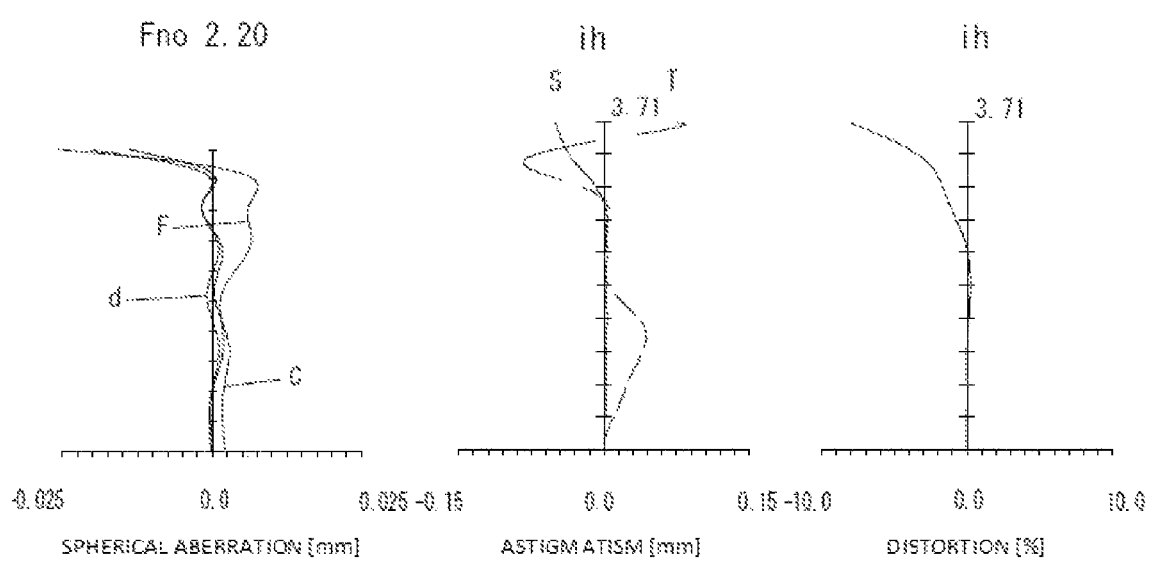
FIG. 22 shows spherical aberration, astigmatism, and distortion of the imaging lens in Example 11 according to the present invention.

FIG. 22 shows spherical aberration (mm), astigmatism (mm), and distortion (%) of the imaging lens in Example 11.

As shown in FIG. 22, each aberration is corrected excellently.

In table 12, values of conditional expressions (1) to (18) related to Examples 1 to 11 are shown.

TABLE 12

| Conditional Expressions | | Example 1 | Example 2 | Example 3 | Example 4 | Example 5 | Example 6 |
|---|---|---|---|---|---|---|---|
| (1) | (T1/f1) × 100 | −3.94 | −4.22 | −2.28 | −4.52 | −6.27 | −5.09 |
| (2) | T2/T3 | 0.07 | 0.07 | 0.05 | 0.07 | 0.07 | 0.04 |
| (3) | f6/D6 | −3.82 | −3.84 | −3.52 | −3.93 | −3.89 | −4.77 |
| (4) | r2/r4 | −1.81 | −1.78 | −1.87 | −1.53 | −1.49 | −1.56 |
| (5) | r1/f | 3.28 | 2.52 | 1.71 | 2.32 | 3.11 | 1.27 |
| (6) | r12/D6 | 2.37 | 2.46 | 1.93 | 2.51 | 2.49 | 1.79 |
| (7) | νd6 | 23.52 | 23.52 | 23.52 | 23.52 | 23.52 | 25.59 |
| (8) | (D1/f1) × 100 | −3.04 | −3.16 | −2.41 | −3.47 | −4.64 | −3.48 |
| (9) | D2/D3 | 2.19 | 2.08 | 1.85 | 2.03 | 2.03 | 2.50 |
| (10) | f4/f | 0.78 | 0.79 | 0.65 | 0.82 | 0.80 | 0.95 |
| (11) | f1/f4 | −4.42 | −4.22 | −6.71 | −3.63 | −2.85 | −3.23 |
| (12) | f1/f6 | 4.74 | 4.53 | 6.45 | 4.03 | 3.04 | 3.32 |
| (13) | |r3|/r4 | −2.64 | −3.54 | −20.19 | −2.69 | −2.51 | −12.03 |
| (14) | r2/r4/r6 | −0.43 | −0.49 | −0.59 | −0.36 | −0.48 | −0.61 |
| (15) | r2/T2 | 145.83 | 128.07 | 121.23 | 119.18 | 108.24 | 86.27 |
| (16) | r4/f | −0.65 | −0.58 | −0.52 | −0.62 | −0.59 | −0.45 |
| (17) | |r7|/f | 1.25 | 1.24 | 1.23 | 1.35 | 1.96 | 1.63 |
| (18) | r8/f | −0.36 | −0.36 | −0.31 | −0.37 | −0.38 | −0.42 |

| Conditional Expressions | | Example 7 | Example 8 | Example 9 | Example 10 | Example 11 |
|---|---|---|---|---|---|---|
| (1) | (T1/f1) × 100 | −5.66 | −5.01 | −5.26 | −6.62 | −7.97 |
| (2) | T2/T3 | 0.11 | 0.18 | 0.10 | 0.18 | 0.40 |
| (3) | f6/D6 | −5.17 | −5.18 | −6.53 | −9.51 | −12.14 |
| (4) | r2/r4 | −1.30 | −1.44 | −1.57 | −1.24 | −0.99 |
| (5) | r1/f | 1.43 | 1.46 | 2.06 | 3.19 | 1.84 |
| (6) | r12/D6 | 2.05 | 2.02 | 2.00 | 1.59 | 1.70 |
| (7) | νd6 | 25.59 | 25.59 | 25.59 | 25.59 | 55.69 |
| (8) | (D1/f1) × 100 | −3.93 | −3.55 | −3.96 | −6.05 | −6.73 |
| (9) | D2/D3 | 2.18 | 2.14 | 2.28 | 3.41 | 3.60 |
| (10) | f4/f | 0.90 | 0.90 | 1.03 | 1.25 | 1.18 |
| (11) | f1/f4 | −3.00 | −3.33 | −2.61 | −1.82 | −1.74 |
| (12) | f1/f6 | 2.78 | 3.07 | 2.30 | 0.98 | 0.72 |
| (13) | |r3|/r4 | −11.97 | −1008.49 | −13.22 | −3.54 | −2.86 |
| (14) | r2/r4/r6 | −0.66 | −0.72 | −0.75 | −0.26 | −0.25 |
| (15) | r2/T2 | 71.77 | 49.14 | 103.37 | 108.60 | 42.12 |
| (16) | r4/f | −0.54 | −0.52 | −0.53 | −0.70 | −0.68 |

TABLE 12-continued

| (17) | \|r7\|/f | 6.50 | 6.50 | 13.21 | 3.81 | 6.44 |
| (18) | r8/f | −0.51 | −0.51 | −0.57 | −0.58 | −0.58 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising, in order from an object side to an image side,
a first lens with negative refractive power having an object-side surface being convex in a paraxial region,
a second lens with positive refractive power in a paraxial region,
a third lens with negative refractive power in a paraxial region,
a fourth lens with positive refractive power in a paraxial region,
a fifth lens having a flat object-side surface and a flat image-side surface that are aspheric, and a sixth lens with negative refractive power having an image-side surface being concave in a paraxial region,
wherein the following conditional expressions (4), (5), (13), (15), and (18') are satisfied:

$$-2.45 < r2/r4 < -0.45 \quad (4)$$

$$0.65 < r1/f < 4.00 \quad (5)$$

$$|r3|/r4 \leq -2.51 \quad (13)$$

$$30.00 < r2/T2 \quad (15)$$

$$-0.58 <= r8/f < -0.15 \quad (18')$$

where
r1: a paraxial curvature radius of an object-side surface of the first lens,
r2: a paraxial curvature radius of an image-side surface of the first lens,
r3: a paraxial curvature radius of an object-side surface of the second lens,
r4: a paraxial curvature radius of an image-side surface of the second lens,
T2: a distance along an optical axis from an image-side surface of the second lens to an object-side surface of the third lens,
r8: a paraxial curvature radius of an image-side surface of the fourth lens, and
f: a focal length of the overall optical system of the imaging lens.

2. The imaging lens according to claim 1, wherein the following conditional expression (1) is satisfied:

$$-9.55 < (T1/f1) \times 100 < -1.00 \quad (1)$$

where
T1: a distance along the optical axis from an image-side surface of the first lens to an object-side surface of the second lens, and
f1: a focal length of the first lens.

3. The imaging lens according to claim 1, wherein the following conditional expression (2) is satisfied:

$$0.02 < T2/T3 < 0.60 \quad (2)$$

where
T2: a distance along the optical axis from an image-side surface of the second lens to an object-side surface of the third lens, and
T3: a distance along the optical axis from an image-side surface of the third lens to an object-side surface of the fourth lens.

4. The imaging lens according to claim 1, wherein the following conditional expression (3) is satisfied:

$$-15.50 < f6/D6 < -1.50 \quad (3)$$

where
f6: a focal length of the sixth lens, and
D6: a thickness along the optical axis of the sixth lens.

5. The imaging lens according to claim 1, wherein the following conditional expression (6) is satisfied:

$$0.80 < r12/D6 < 3.00 \quad (6)$$

where
r12: a paraxial curvature radius of an image-side surface of the sixth lens, and
D6: a thickness along the optical axis of the sixth lens.

* * * * *